US012671536B2

(12) United States Patent
Abdelghaffar et al.

(10) Patent No.:  US 12,671,536 B2
(45) Date of Patent:       Jun. 30, 2026

(54) DETERMINING AN AVAILABLE SLOT FOR AN APERIODIC SOUNDING REFERENCE SIGNAL (SRS) RESOURCE SET

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Alberto Rico Alvarino, San Diego, CA (US); Yu Zhang, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 525 days.

(21) Appl. No.: 18/248,337

(22) PCT Filed: Dec. 24, 2020

(86) PCT No.: PCT/CN2020/138860
§ 371 (c)(1),
(2) Date: Apr. 7, 2023

(87) PCT Pub. No.: WO2022/133864
PCT Pub. Date: Jun. 30, 2022

(65) Prior Publication Data
US 2023/0379111 A1      Nov. 23, 2023

(51) Int. Cl.
*H04W 72/232*      (2023.01)
*H04L 5/00*      (2006.01)
*H04W 72/0446*      (2023.01)

(52) U.S. Cl.
CPC ....... *H04L 5/0048* (2013.01); *H04W 72/0446* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2012/0008646 A1 | 1/2012 | Fourcand | |
| 2020/0059951 A1 | 2/2020 | Frenne et al. | |
| (Continued) | | | |

FOREIGN PATENT DOCUMENTS

| | | |
|---|---|---|
| CN | 102484548 A | 5/2012 |
| CN | 110419239 A | 11/2019 |
| CN | 110463127 A | 11/2019 |
| CN | 110650001 A | 1/2020 |
| CN | 111201746 A | 5/2020 |
| CN | 111357231 A | 6/2020 |

OTHER PUBLICATIONS

International Search Report and Written Opinion—PCT/CN2020/138860—ISA/EPO—Sep. 15, 2021.
(Continued)

*Primary Examiner* — Duc T Duong
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, downlink control information (DCI) that triggers one or more aperiodic sounding reference signal (SRS) resource sets. The UE may determine that a candidate slot is an available slot associated with the one or more aperiodic SRS resource sets based at least in part on available information at a timestamp of the candidate slot, and one or more of a radio resource control (RRC) configuration or dynamic event information. The UE may transmit, to the base station, an aperiodic SRS using the one or more aperiodic SRS resource sets of the available slot. Numerous other aspects are described.

35 Claims, 13 Drawing Sheets

1200 ——▸

(56) References Cited

U.S. PATENT DOCUMENTS

| | | | | |
|---|---|---|---|---|
| 2020/0304230 A1* | 9/2020 | Papasakellariou | .... | H04L 5/0094 |
| 2020/0336340 A1* | 10/2020 | Qin | ........................ | H04B 7/0617 |
| 2021/0067291 A1* | 3/2021 | Gao | ........................ | H04L 5/0048 |
| 2021/0266910 A1* | 8/2021 | Yliuntinen | ........ | H04W 72/0446 |
| 2022/0330300 A1* | 10/2022 | Wang | ................ | H04W 72/1273 |
| 2023/0156645 A1* | 5/2023 | Yao | ..................... | H04W 72/231 |
| | | | | 455/12.1 |
| 2023/0239843 A1* | 7/2023 | Liu | ........................ | H04L 5/0096 |
| | | | | 370/329 |
| 2023/0246783 A1* | 8/2023 | Tian | ..................... | H04L 5/0051 |
| | | | | 370/329 |
| 2023/0361964 A1* | 11/2023 | Gao | ........................ | H04L 5/0048 |

OTHER PUBLICATIONS

Qualcomm Incorporated: "Discussion on SRS Enhancement", 3GPP TSG-RAN WG1 Meeting #103-e, R1-2009255, 3rd Generation Partnership Project, Mobile Competence Centre, 650, Route Des Lucioles, F-06921 Sophia-Antipolis Cedex, France, vol. Ran WG1, No. e-Meeting, Oct. 26, 2020-Nov. 13, 2020, Oct. 24, 2020, XP051946918, 32 Pages.

Intel Corporation: "Discussion on SRS Enhancements", 3GPP TSG RAN WG1 Meeting #102-e, R1-2005863, 3rd Generation Partnership Project, Mobile Competence Centre, 650, Route Des Lucioles, F-06921 Sophia-Antipolis Cedex, France, vol. Ran WG1, No. e-Meeting, Aug. 17, 2020-Aug. 28, 2020, Aug. 8, 2020, 13 Pages, XP051917764, Section 2.1.2.

Lenovo, et al., "Enhancements on Srs", 3GPP TSG RAN WG1#103-e, R1-2008914, 3rd Generation Partnership Project, Mobile Competence Centre, 650, Route Des Lucioles, F-06921 Sophia-Antipolis Cedex, France, vol. Ran WG1, No. e-Meeting, Oct. 26, 2020-Nov. 13, 2020, Nov. 1, 2020, 7 Pages, XP052350846, Section 2.1.

Moderator (ZTE): "Fl Summary #1 on SRS Enhancements", 3GPP TSG RAN WG1 Meeting #103-e, R1-2009384, 3rd Generation Partnership Project, Mobile Competence Centre, 650, Route Des Lucioles, F-06921 Sophia-Antipolis Cedex, France, vol. Ran WG1, No. e-Meeting, Oct. 26, 2020-Nov. 13, 2020, Nov. 5, 2020, 29 Pages, XP052351296, Section 2.1.

Supplementary European Search Report—EP20966437—Search Authority—The Hague—Sep. 18, 2024.

* cited by examiner

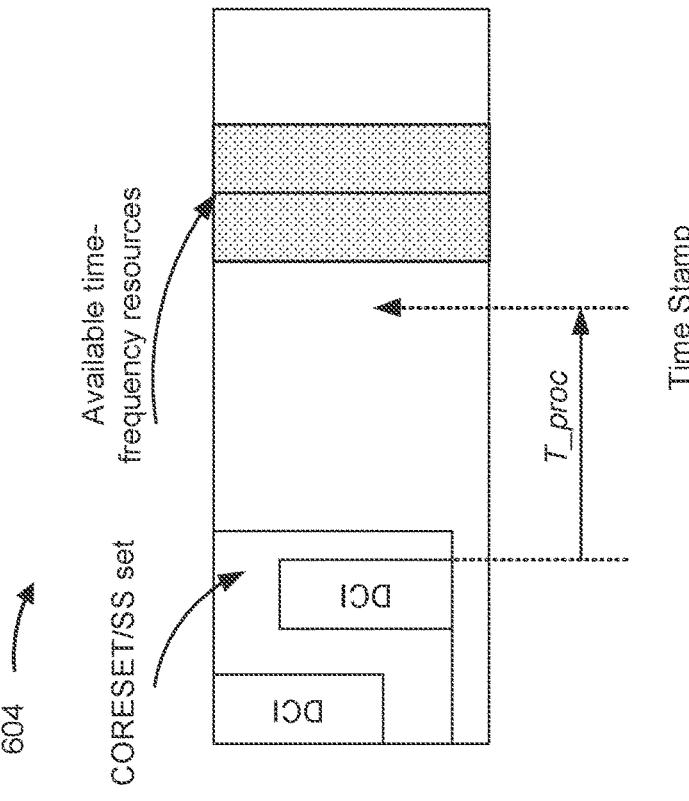
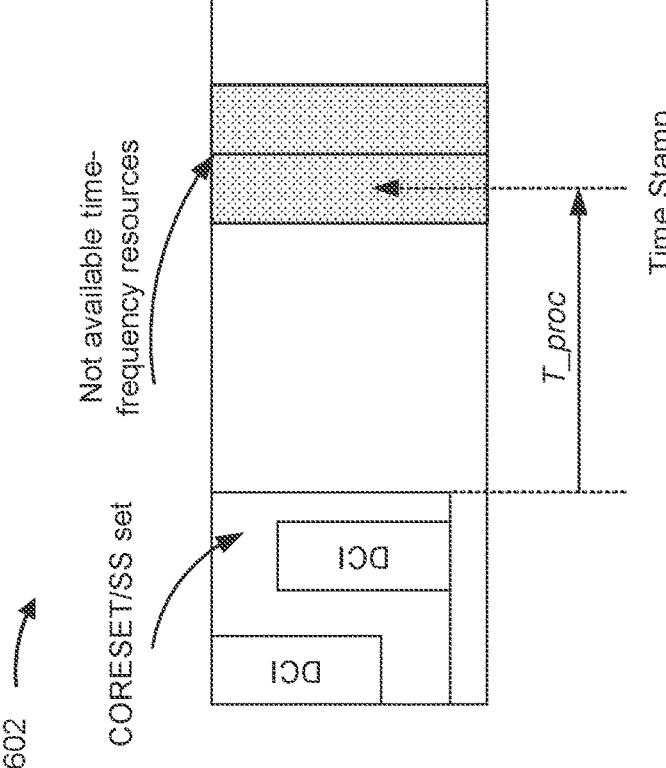
FIG. 6

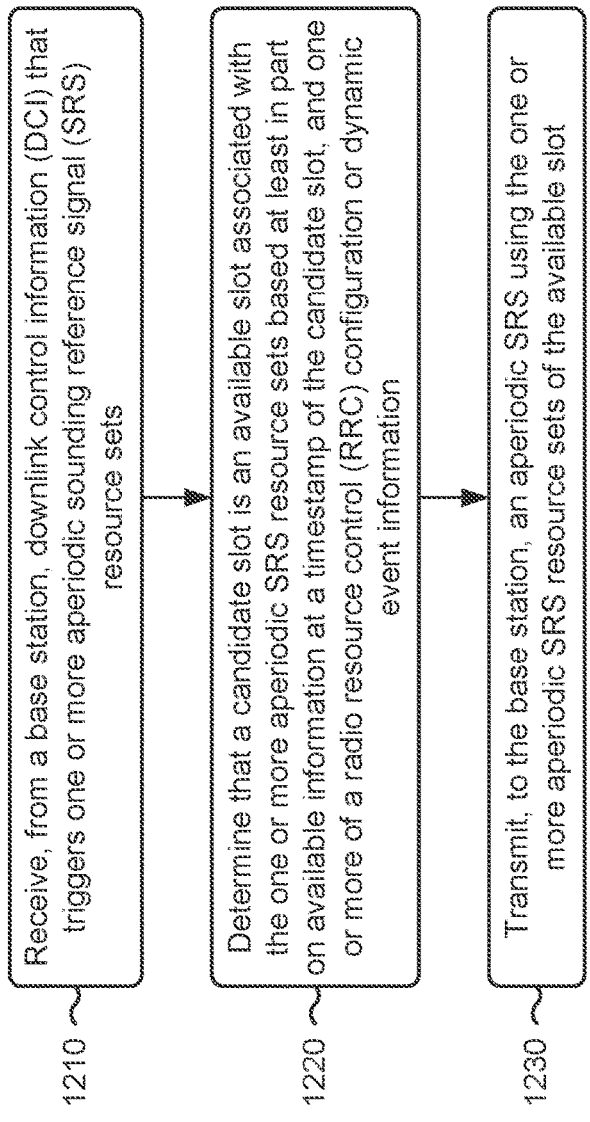

1200

1210 — Receive, from a base station, downlink control information (DCI) that triggers one or more aperiodic sounding reference signal (SRS) resource sets 1220 — Determine that a candidate slot is an available slot associated with the one or more aperiodic SRS resource sets based at least in part on available information at a timestamp of the candidate slot, and one or more of a radio resource control (RRC) configuration or dynamic event information 1230 — Transmit, to the base station, an aperiodic SRS using the one or more aperiodic SRS resource sets of the available slot

FIG. 12

DETERMINING AN AVAILABLE SLOT FOR AN APERIODIC SOUNDING REFERENCE SIGNAL (SRS) RESOURCE SET

CROSS-REFERENCE TO RELATED APPLICATION

This Patent Application is a 371 national stage of PCT Application No. PCT/CN2020/138860 filed on Dec. 24, 2020, entitled "DETERMINING AN AVAILABLE SLOT FOR AN APERIODIC SOUNDING REFERENCE SIGNAL (SRS) RESOURCE SET," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining an available slot for an aperiodic SRS resource set.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a UE for wireless communication includes a memory and one or more processors operatively coupled to the memory, the memory and the one or more processors configured to: receive, from a base station, downlink control information (DCI) that triggers one or more aperiodic sounding reference signal (SRS) resource sets; determine that a candidate slot is an available slot associated with the one or more aperiodic SRS resource sets based at least in part on available information at a timestamp of the candidate slot, and one or more of a radio resource control (RRC) configuration or dynamic event information; and transmit, to the base station, an aperiodic SRS using the one or more aperiodic SRS resource sets of the available slot.

In some aspects, a method of wireless communication performed by a UE includes receiving, from a base station, DCI that triggers one or more aperiodic SRS resource sets, determining that a candidate slot is an available slot associated with the one or more aperiodic SRS resource sets based at least in part on available information at a timestamp of the candidate slot, and one or more of an RRC configuration or dynamic event information; and transmitting, to the base station, an aperiodic SRS using the one or more aperiodic SRS resource sets of the available slot.

In some aspects, a non-transitory computer-readable medium storing a set of instructions for wireless communication includes one or more instructions that, when executed by one or more processors of a UE, cause the UE to: receive, from a base station, DC that triggers one or more aperiodic SRS resource sets; determine that a candidate slot is an available slot associated with the one or more aperiodic SRS resource sets based at least in part on available information at a timestamp of the candidate slot, and one or more of an RRC configuration or dynamic event information; and transmit, to the base station, an aperiodic SRS using the one or more aperiodic SRS resource sets of the available slot.

In some aspects, an apparatus for wireless communication includes means for receiving, from a base station, DCI that triggers one or more aperiodic SRS resource sets; means for determining that a candidate slot is an available slot associated with the one or more aperiodic SRS resource sets based at least in part on available information at a timestamp of the candidate slot, and one or more of an RRC configuration or dynamic event information; and means for transmitting, to the base station, an aperiodic SRS using the one or more aperiodic SRS resource sets of the available slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-11 are diagrams illustrating examples associated with determining an available slot for an aperiodic SRS resource set, in accordance with various aspects of the present disclosure.

FIG. 12 is a diagram illustrating an example process associated with determining an available slot for an aperiodic SRS resource set, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
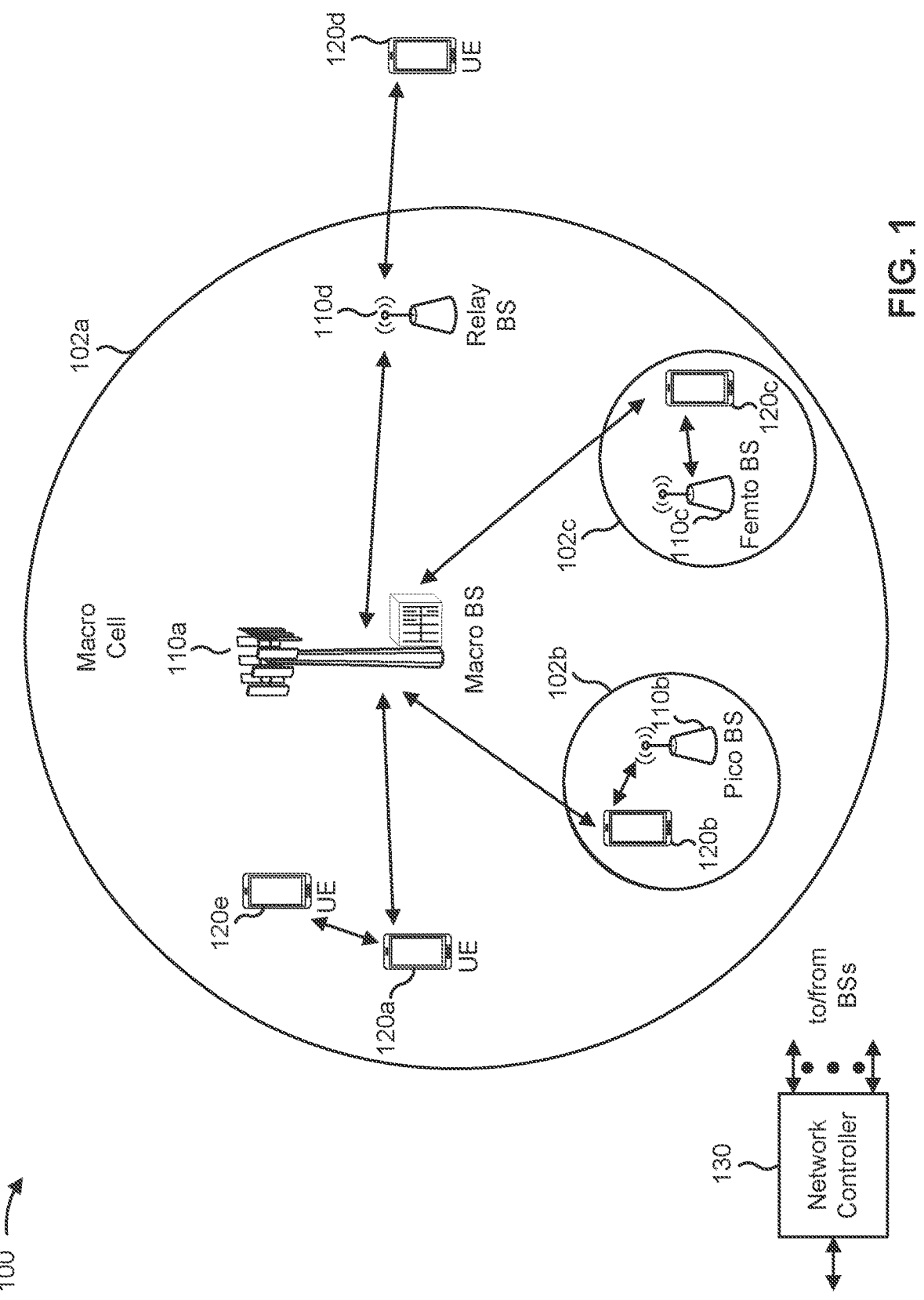
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
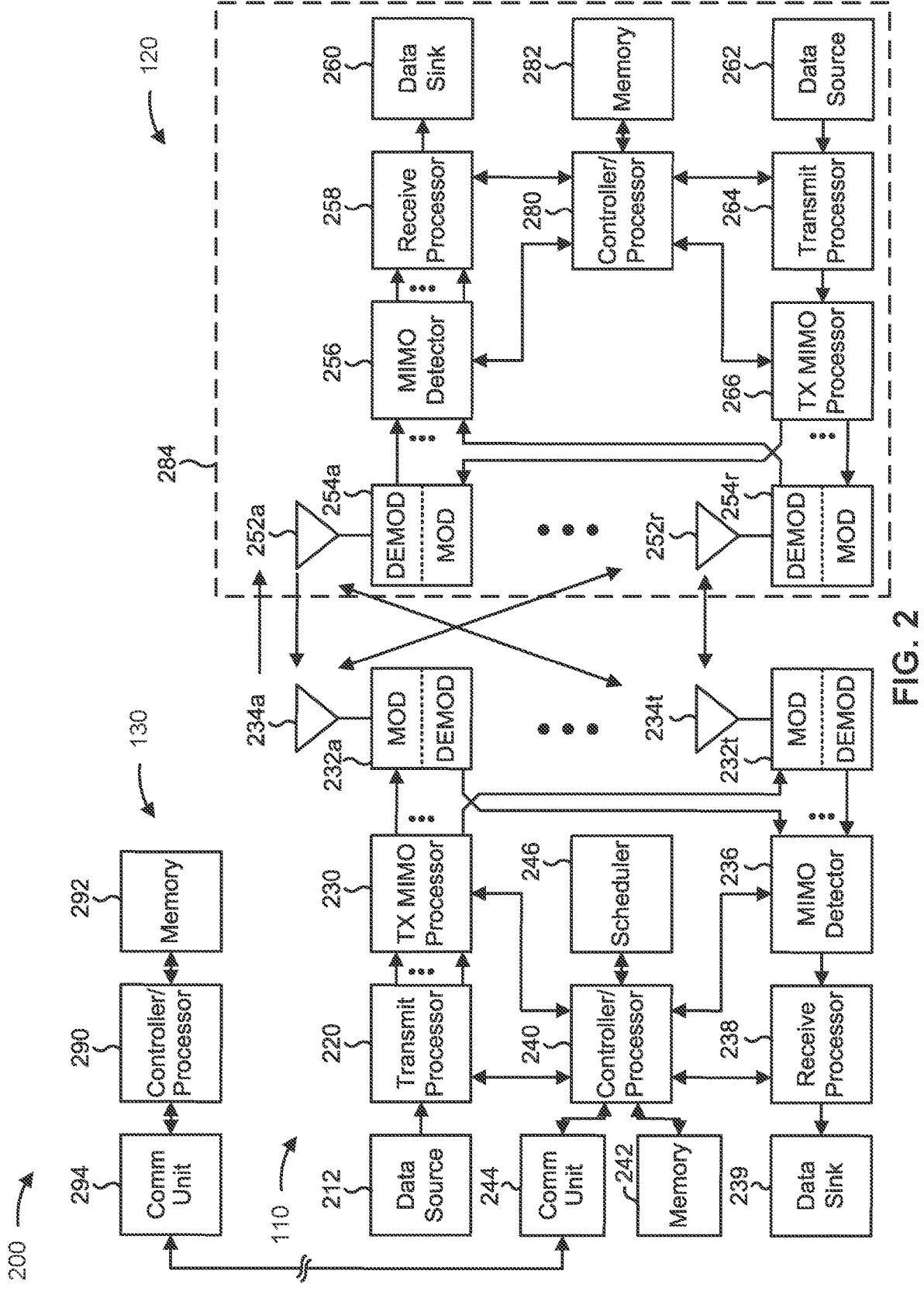
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-12.

Controller/processor 240 of base station 110, controller/processor 280 of UE 120, and/or any other component(s) of FIG. 2 may perform one or more techniques associated with determining an available slot for an aperiodic SRS resource set, as described in more detail elsewhere herein. For example, controller/processor 240 of base station 110, controller/processor 280 of UE 120, and/or any other component(s) of FIG. 2 may perform or direct operations of, for example, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, and/or other processes as described herein. In some aspects, executing instructions may include running the instructions, converting the instructions, compiling the instructions, and/or interpreting the instructions, among other examples.

In some aspects, the UE includes means for receiving, from a base station, DCI that triggers one or more aperiodic SRS resource sets; means for determining that a candidate slot is an available slot associated with the one or more aperiodic SRS resource sets based at least in part on available information at a timestamp of the candidate slot, and one or more of an RRC configuration or dynamic event information; and/or means for transmitting, to the base station, an aperiodic SRS using the one or more aperiodic SRS resource sets of the available slot. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, from the base station, a high layer parameter that configures the UE to determine that the candidate slot is the available slot based at least in part on the timestamp and the RRC configuration and by excluding the dynamic event information.

In some aspects, the UE includes means for receiving, from the base station, a high layer parameter that configures the UE to determine that the candidate slot is the available slot based at least in part on the timestamp, the RRC configuration, and the dynamic event information.

In some aspects, the DCI is a first DCI and the candidate slot is a first candidate slot, and the UE includes means for determining that a second candidate slot is not an available slot based at least in part on second DCI received in the second candidate slot, wherein the second DCI dynamically schedules a downlink shared channel or an uplink shared channel in the second candidate slot that overlaps with time and frequency resources in the second candidate slot, and wherein the time and frequency resources in the second candidate slot are not available for the one or more aperiodic SRS resource sets.

In some aspects, the candidate slot is a first candidate slot, and the UE includes means for determining that a second candidate slot is not an available slot based at least in part on a slot format indicator received in the second candidate slot and prior to a timestamp of the second candidate slot, wherein the slot format indicator converts the second candidate slot from a flexible slot to a downlink slot, or the slot format indicator converts one or more symbols of the second candidate slot to reserved symbols or downlink symbols, and wherein the second candidate slot does not include time and frequency resources for the one or more aperiodic SRS resource sets.

In some aspects, the UE includes means for determining that the candidate slot is the available slot based at least in part on an exclusion of a slot format indicator received in the candidate slot.

In some aspects, the UE includes means for determining a collision between the aperiodic SRS in the available slot and another signal or channel based at least in part on a set of collision and priority rules; and/or means for determining to drop the aperiodic SRS based at least in part on the collision, and after determining that the candidate slot is the available slot.

In some aspects, the UE includes means for performing collision handling prior to determining that the candidate slot is the available slot.

In some aspects, the UE includes means for determining to drop the aperiodic SRS based at least in part on satisfying a threshold for a number of aperiodic SRS transmission delays due to collisions with other signals or channels.

In some aspects, the UE includes means for receiving a second DCI in the candidate slot, wherein the second DCI includes carrier switching information that enables the UE to switch from a first component carrier to a second component carrier for transmitting the aperiodic SRS.

In some aspects, the DCI is a first DCI and the candidate slot is a first candidate slot, and the UE includes means for receiving a second DCI in a second candidate slot, wherein the second DCI includes uplink cancellation information to cancel an uplink resource of the second candidate slot; and/or means for determining that the second candidate slot is not an available slot based at least in part on the uplink cancellation information received in the second candidate slot and prior to a timestamp of the second candidate slot.

In some aspects, the UE includes means for determining that the candidate slot is the available slot based at least in part on an exclusion of uplink cancellation information received in the candidate slot.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

An aperiodic SRS triggering mechanism may involve transmitting DCI in an uplink or a downlink. The DCI may include a two-bit SRS request field having a value that corresponds to triggered aperiodic SRS resource set(s). For example, a value of "00" may correspond to no triggered aperiodic SRS resource set. A value of "01" may correspond to SRS resource set(s) configured with a higher layer parameter aperiodicSRS-ResourceTrigger set to 1. A value of "10" may correspond to SRS resource set(s) configured with a higher layer parameter aperiodicSRS-ResourceTrigger set to 2. A value of "11" may correspond to SRS resource set(s) configured with a higher layer parameter aperiodicSRS-ResourceTrigger set to 3. In other words, each aperiodic SRS resource set may be tagged with a value of 1, 2, or 3, which may correspond to different aperiodic SRS resource sets.

Each aperiodic SRS resource set may be configured via radio resource control (RRC) signaling with a slot offset (slotOffset) value ranging from 0 to 32. The slot offset value may be an offset in number of slots between the DCI that triggers the aperiodic SRS resource set (a triggering DCI) to be configured and an actual transmission of a configuration for the aperiodic SRS resource set. When the slot offset value is absent, a UE may apply no slot offset (e.g., value 0). Further, each SRS resource of the aperiodic SRS resource set may have an associated symbol index of a first symbol containing the SRS resource (e.g., a startPosition parameter), and the SRS resource may span multiple consecutive OFDM symbols.

DCI format 0_1 may be used for scheduling a physical uplink shared channel (PUSCH) in a cell. DCI format 0_1 may be used to transmit various information based at least in part on a cyclic redundancy check (CRC) scrambled by a cell radio network temporary identifier (C-RNTI), a configured scheduling radio network temporary identifier (CS-RNTI), a semi-persistent channel state information radio network temporary identifier (SP-CSI-RNTI), or a modulation coding scheme cell radio network temporary identifier (MCS-C-RNTI). The information may include an identifier for a DCI format, which may occupy one bit. The identifier for the DCI format may include a bit field value set to zero, which may indicate an uplink DCI format. The information may include a carrier indicator, which may occupy zero or three bits. The information may include an SRS request field, which may occupy two bits for UEs not configured with a supplementary uplink in a serving cell configuration in the cell.

DCI format 1_1 may be used for scheduling a physical downlink shared channel (PDSCH) in a cell. DCI format 1_1 may be used to transmit various information based at least in part on a CRC scrambled by a C-RNTI, a CS-RNTI, an SP-CSI-RNTI, or an MCS-C-RNTI. The information may include an identifier for a DCI format, which may occupy one bit. The identifier for the DCI format may include a bit field value set to one, which may indicate a downlink DCI format. The information may include a carrier indicator, which may occupy zero or three bits. The information may include an SRS request field, which may occupy two bits for UEs not configured with a supplementary uplink in a serving cell configuration in the cell.

An aperiodic SRS may be triggered in an uplink or a downlink at slot n, and the aperiodic SRS may be transmitted at slot n+k, where k is a slot offset based at least in part on a higher level RRC parameter. In some cases, the aperiodic SRS may not be transmitted at a scheduled slot due to resources not being available for the aperiodic transmission. For example, the resources may be associated with a flexible slot, which may be converted to a downlink slot based at least in part on a slot format indicator (SFI), or the resources may collide with a higher priority signal or channel, thereby resulting in the resources being unavailable for the aperiodic SRS transmission. In other cases, in a multi-user SRS triggering scenario, physical downlink control channel (PDCCH) congestion may prevent the network from transmitting multiple PDCCHs at a specific slot to trigger the aperiodic SRS.

Figure 3:
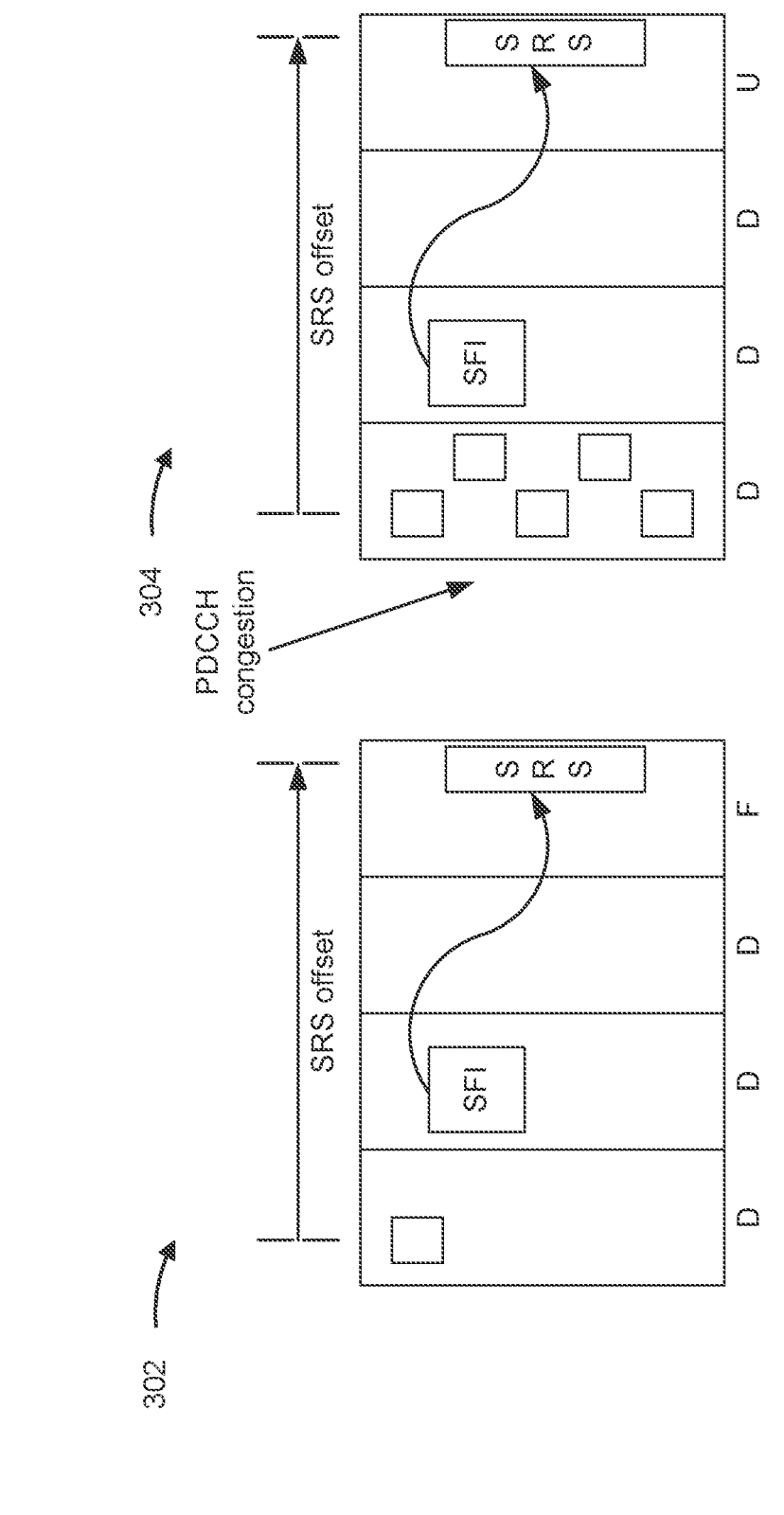
FIG. 3 is a diagram illustrating an example of an aperiodic SRS transmission, in accordance with various aspects of the present disclosure.

FIG. 3 is a diagram illustrating an example 300 of an aperiodic SRS transmission, in accordance with various aspects of the present disclosure.

As shown by reference number 302, an aperiodic SRS may be triggered in a first slot (e.g., a downlink slot n). Typically, the aperiodic SRS may be transmitted at slot n+k based at least in part on a slot offset, which may correspond to a fourth slot (e.g., a flexible slot). However, in this case, an SFI may be transmitted in a second slot (e.g., a downlink slot), which may modify a configuration of the fourth slot (e.g., convert the flexible slot to a downlink slot). As a result, the aperiodic SRS may be unable to be transmitted in the fourth slot.

As shown by reference number 304, PDCCH congestion may prevent an aperiodic SRS from being triggered in a first slot (e.g., a downlink slot n). In this example, since the aperiodic SRS is not triggered, the aperiodic SRS cannot be transmitted at slot n+k, even though corresponding resources (e.g., resources at the fourth slot) may be available for an aperiodic SRS transmission.

As indicated above, FIG. 3 is provided as an example. Other examples may differ from what is described with regard to FIG. 3.

An aperiodic SRS resource set may be available in a (t+1)-th available slot counting from a reference slot, where i may be indicated using DCI or RRC signaling. For example, RRC signaling may be used when one value of i is configured, where candidate values of t may include zero. The reference slot may be a slot with a triggering DCI. The reference slot may be a slot indicated by a legacy triggering offset. Further, i may be explicitly or implicitly indicated, and candidate values of t may be updated using a medium access control control element (MAC-CE). In other words, candidate triggering offsets may be updated using a MAC-CE.

The (t+1)-th available slot may be based at least in part on a UE processing complexity and timeline, and/or potential co-existence with collision handling. The (t+1)-th available slot may be based at least in part on an RRC configuration. For example, the (t+1)-th available slot may be a slot that includes uplink or flexible symbol(s) for time-domain location(s) for a plurality of SRS resources in a resource set, and the slot may satisfy a minimum timing requirement between a triggering PDCCH and the plurality of SRS resources (e.g., all SRS resources) in the resource set.

Figure 4:
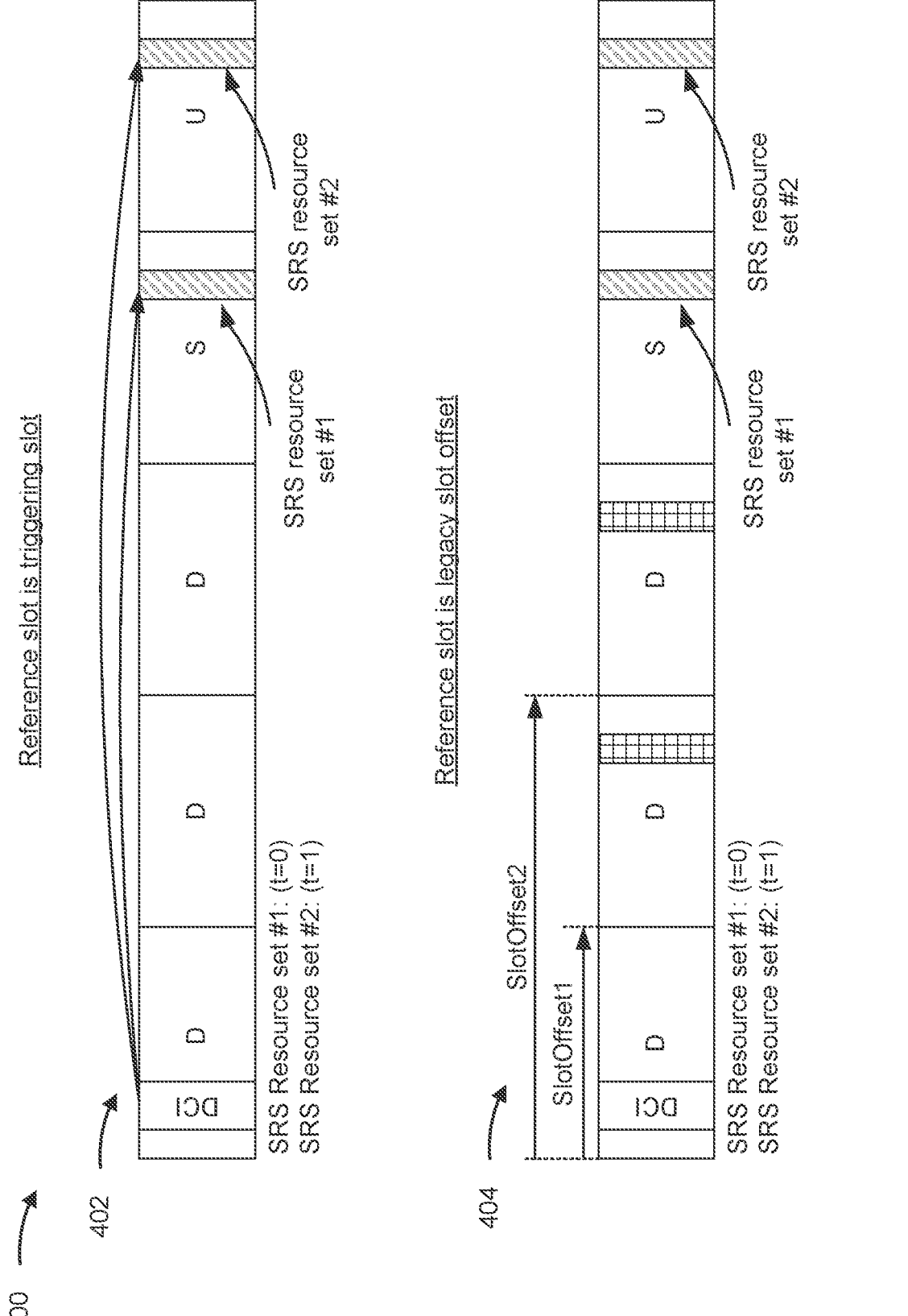
FIG. 4 is a diagram illustrating an example of a triggered aperiodic SRS resource set, in accordance with various aspects of the present disclosure.

FIG. 4 is a diagram illustrating an example 400 of a triggered aperiodic SRS resource set, in accordance with various aspects of the present disclosure.

As shown by reference number 402, five consecutive slots may include a first slot that corresponds a downlink slot, a second slot that corresponds to a downlink slot, a third slot that corresponds to a downlink slot, a fourth slot that corresponds to a special slot, and a fifth slot that corresponds to an uplink slot. DCI may be transmitted in the first slot that triggers a first aperiodic SRS resource set and a second aperiodic SRS resource set. The first aperiodic SRS resource set and the second aperiodic SRS resource set may be available in an available slot i, which may be indicated using the DCI and/or RRC signaling. The available slot t may be later in time as compared to a reference slot. The reference slot may be a DCI triggering slot (e.g., the first slot). In other words, the reference slot may be the first slot. The DCI and/or RRC signaling may indicate that t is zero for the first aperiodic SRS resource set and t is one for the second aperiodic SRS resource set. The first aperiodic SRS resource set may be associated with a first available slot (e.g., based at least in part on t=0) with respect to the reference slot, and the second aperiodic SRS resource set may be associated with a second available slot (e.g., based at least in part on t=1) with respect to the reference slot, where the first available slot may be the fourth slot corresponding to the special slot and the second available slot may be the fifth slot corresponding to the uplink slot.

As shown by reference number 404, the reference slot may be a legacy slot offset, rather than a DCI triggering slot (e.g., the first slot). The first aperiodic SRS resource set may be associated with a first available slot (e.g., corresponding to t=0) in relation to a first slot offset, and the second aperiodic SRS resource set may be associated with a second available slot (e.g., corresponding to t=1) in relation to a second slot offset. The first available slot may be the fourth slot corresponding to the special slot and the second available slot may be the fifth slot corresponding to the uplink slot.

As indicated above, FIG. 4 is provided as an example. Other examples may differ from what is described with regard to FIG. 4.

An aperiodic SRS may be triggered at a slot, and the aperiodic SRS may be transmitted at a later scheduled slot. In some cases, the aperiodic SRS may not be transmitted at the scheduled slot due to resources not being available for the aperiodic SRS transmission. For example, the resources may unavailable due to a variety of reasons, such as an SFI received from a base station, dynamic scheduling information received from the base station, uplink cancellation information received from the base station, collision handling performed at the UE, carrier switching performed at the UE, etc. In these cases, the UE may schedule the aperiodic SRS transmission in the later slot, but then may be unable to perform the aperiodic SRS transmission at the later slot. As a result, the UE may need to reschedule the aperiodic SRS transmission in an even later slot, thereby wasting processing resources at the UE, and resources in the even later slot may become unavailable.

In various aspects of techniques and apparatuses described herein, a UE may receive, from a base station, DCI that triggers an aperiodic SRS resource set. The UE may determine an available slot (e.g., a next available slot) for the aperiodic SRS resource set. The available slot may include uplink and/or flexible symbol(s) for SRS resources (e.g., all SRS resources) in the aperiodic SRS resource set, and the available slot may satisfy a minimum timeline between a PDCCH (e.g., DCI) that triggers the aperiodic SRS resource set and the aperiodic SRS resource set. The UE may transmit, to the base station, an aperiodic SRS using the aperiodic SRS resource set of the available slot.

In various aspects of techniques and apparatuses described herein, the UE may determine the available slot based at least in part on an RRC configuration and/or dynamic events. The UE may receive a high layer parameter that indicates whether the available slot is to be determined based at least in part on the RRC configuration and/or the dynamic events. The UE may determine the available slot based at least in part on the RRC configuration and without consideration of dynamic events, based at least in part on the high layer parameter (e.g., a bit value of "0"). Alternatively, the UE may determine the available slot based at least in part on the RRC configuration and dynamic events, based at least in part on the high layer parameter (e.g., a bit value of "1").

In various aspects of techniques and apparatuses described herein, the RRC configuration may include a time division duplex (TDD) uplink and downlink pattern, such as a downlink-downlink-downlink-special-uplink pattern. The RRC configuration may include an SRS resource set configuration that indicates a time and frequency of SRS resources. The RRC configuration may include SRS resources configurations (or SRS resource configurations) within the SRS resource set. The SRS resource set and the SRS resources configurations may indicate the time and frequency configuration for transmitting the SRS at the available slot. A dynamic event may include an SFI transmission, dynamic scheduling information, collision handling, uplink cancellation information, downlink preemption indication information, and/or carrier switching.

Figure 5:
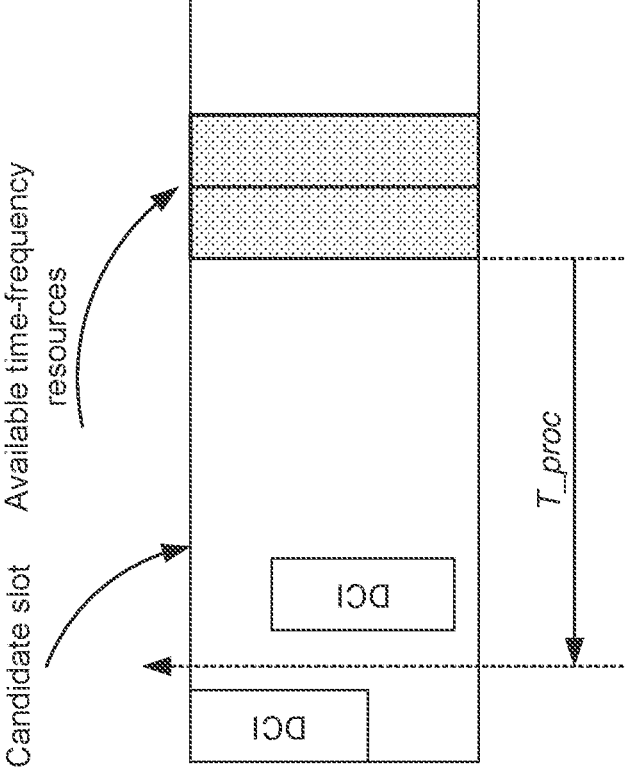

FIG. 5 is a diagram illustrating an example 500 of determining an available slot for an aperiodic SRS resource set, in accordance with various aspects of the present disclosure.

A UE (e.g., UE 120) may identify a candidate slot that includes SRS resources. The UE may determine whether the candidate slot is an available slot based at least in part on a timestamp. The UE may determine, for the candidate slot, available resource(s) based at least in part on available information at the UE at the timestamp. The timestamp may be represented by $n-T\_proc$, where n is a time at which the UE starts a transmission of a first symbol of a triggered aperiodic SRS (e.g., a 'startPosition' parameter that is RRC configured per SRS resource), and $T\_proc$: is counted in terms of symbols and is a minimum processing timeline capability. The candidate slot may be an uplink slot, a flexible slot, or a special slot that has available time-frequency resources for an SRS resource set transmission (e.g., all SRS resources within the SRS resource set).

As shown in FIG. 5, a UE may receive a first DCI from a base station in a candidate slot. The UE may determine whether the candidate slot is an available slot based at least in part on available information at the UE at a timestamp ($n-T\_proc$). In this example, n corresponds to a start of available time-frequency resources (e.g., SRS resources), and $T\_proc$ is a number of symbols corresponding to the minimum processing timeline capability. The UE may include the first DCI in the available information when determining whether the candidate slot is an available slot, since the first DCI is received prior to the timestamp. However, the UE may not consider a second DCI that is received from the base station after the timestamp. In this example, the UE may determine that the candidate slot is an available slot.

As indicated above, FIG. 5 is provided as an example. Other examples may differ from what is described with regard to FIG. 5.

FIG. 6 is a diagram illustrating an example 600 of determining an available slot for an aperiodic SRS resource set, in accordance with various aspects of the present disclosure.

A UE (e.g., UE 120) may identify a candidate slot that includes SRS resources. The UE may determine whether the candidate slot is an available slot based at least in part on available information at the UE at a timestamp. The timestamp may be represented by $n+T\_proc+d$, where n is an end of a last symbol in a control resource set (CORESET), an end of a last symbol of a PDCCH, or an end of a last symbol of a monitoring occasion of a search space (SS) set of the CORESET, $T\_proc$ is counted in terms of symbols and is a minimum processing timeline capability, and d is a constant number of symbols based at least in part on a UE capability (e.g., 0, 1, or 2 symbols). The candidate slot may be an uplink slot, a flexible slot, or a special slot that has available time-frequency resources for an SRS resource set transmission (e.g., all SRS resources within the SRS resource set).

As shown by reference number 602, the UE may receive a first DCI and a second DCI from a base station in a candidate slot. The UE may receive the first DCI and the second DCI using a CORESET or an SS set. The UE may determine whether the candidate slot is an available slot based at least in part on available information at the UE at a timestamp ($n+T\_proc+d$). In this example, n corresponds to an end of a last symbol in the CORESET or the SS set. The UE may include both the first DCI and the second DCI in the available information when determining whether the candidate slot is an available slot, since the first DCI and the second DCI are received prior to the timestamp. Further, in this example, the timestamp may occur after a start of a first time-frequency resource (e.g., an SRS resource). As a result, the first time-frequency resource may not be available, and the candidate slot is not an available slot.

As shown by reference number 604, a UE may receive a first DCI and a second DCI from a base station in a candidate slot. The UE may receive the first DCI and the second DCI using a CORESET or an SS set. The UE may determine whether the candidate slot is an available slot based at least in part on available information at the UE at a timestamp ($n+T\_proc+d$). In this example, n corresponds to an end of a last symbol of the PDCCH (e.g., at a last DCI received at the UE). The UE may include both the first DCI and the second DCI in the available information when determining whether the candidate slot is an available slot, since the first DCI and the second DCI are received prior to the timestamp.

Further, in this example, the timestamp may be prior to time-frequency resources (e.g., SRS resources). As a result, the time-frequency resources may be available, and the candidate slot is an available slot.

As indicated above, FIG. 6 is provided as an example. Other examples may differ from what is described with regard to FIG. 6.

In some aspects, a scheduling cell associated with a DCI and a scheduled cell associated with SRS resources may have a different subcarrier spacing (SCS). The scheduling cell may be associated with a first SCS and the scheduled cell may be associated with a second SCS, in accordance with a cross-component carrier (cross-CC) scheduling. In some cases, a downlink and an uplink in a paired spectrum may be associated with different SCSs. In some aspects, a triggering DCI may be associated with a PDCCH with a first SCS and the SRS resources may be associated with a second SCS.

In some aspects, a processing time (T_proc) may be based at least in part on a maximum time duration between two durations spanned by N OFDM symbols of a numerology of the scheduling cell and the scheduled cell, respectively. The parameter N may be a reported capability as a minimum time interval (in symbols) between a DCI triggering associated with the scheduling cell and an aperiodic SRS transmission associated with the scheduled cell. The processing time may be represented by max(N1_SCS1, N2_SCS2). In other words, the processing time may be a maximum between a first minimum time interval associated with the first SCS and a second minimum time interval associated with the second SCS.

Figure 7:
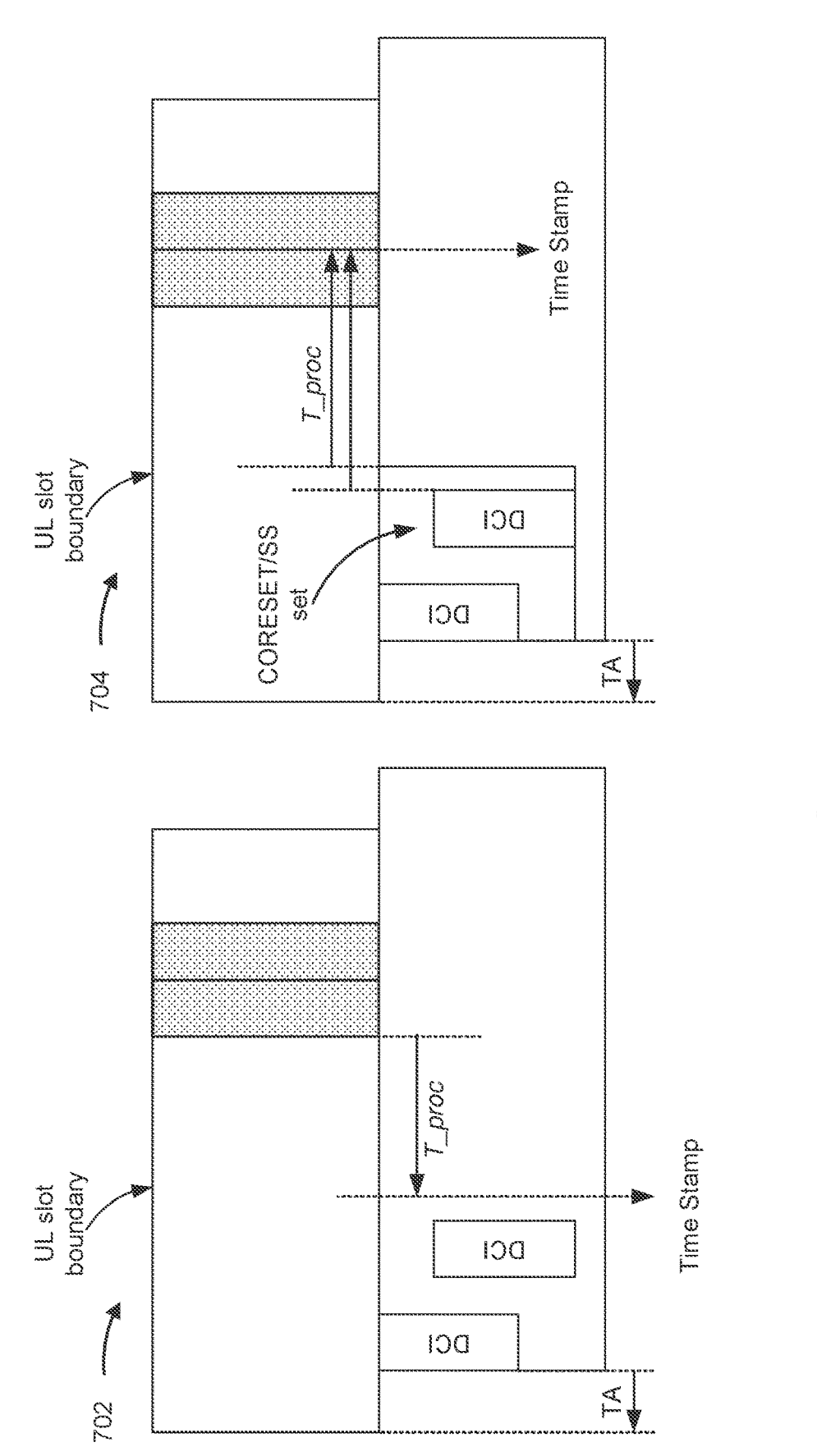

FIG. 7 is a diagram illustrating an example 700 of determining an available slot for an aperiodic SRS resource set, in accordance with various aspects of the present disclosure.

As shown by reference number 702, a UE may receive a first DCI and a second DCI from a base station using a downlink slot. The UE may receive the first DCI and the second DCI from a serving cell. Time-frequency resources (e.g., SRS resources) may be configured in a candidate slot, which may be an uplink slot used by a secondary cell. The UE may determine whether the candidate slot is an available slot based at least in part on available information at the UE at a timestamp (n−T_proc). In this example, n corresponds to a start of time-frequency resources, and T_proc is a number of symbols corresponding to the minimum processing timeline capability. The UE may include the first DCI and the second DCI in the available information when determining whether the candidate slot is an available slot. Further, the UE may include a timing advance when determining the timestamp, since an uplink is transmitted in advance of a downlink by a timing advance value. As a result, the UE may include the timing advance when determining whether the candidate slot is an available slot.

As shown by reference number 704, a UE may receive a first DCI and a second DCI from a base station using a downlink slot. The UE may receive the first DCI and the second DCI from a serving cell. The UE may receive the first DCI and the second DCI using a CORESET or an SS set. Time-frequency resources (e.g., SRS resources) may be configured in a candidate slot, which may be an uplink slot used by a secondary cell. The UE may determine whether the candidate slot is an available slot based at least in part on available information at the UE at a timestamp (n+T_proc+ d). In this example, n corresponds to an end of a last symbol in the CORESET or the SS set or an end of a last symbol of the PDCCH (e.g., at a last DCI received at the UE). The UE may include both the first DCI and the second DCI in the available information when determining whether the candidate slot is an available slot, since the first DCI and the second DCI are received prior to the timestamp. Further, the UE may include a timing advance when determining the timestamp, since an uplink is transmitted in advance of a downlink by a timing advance value. As a result, the UE may include the timing advance when determining whether the candidate slot is an available slot.

As indicated above, FIG. 7 is provided as an example. Other examples may differ from what is described with regard to FIG. 7.

Figure 8:
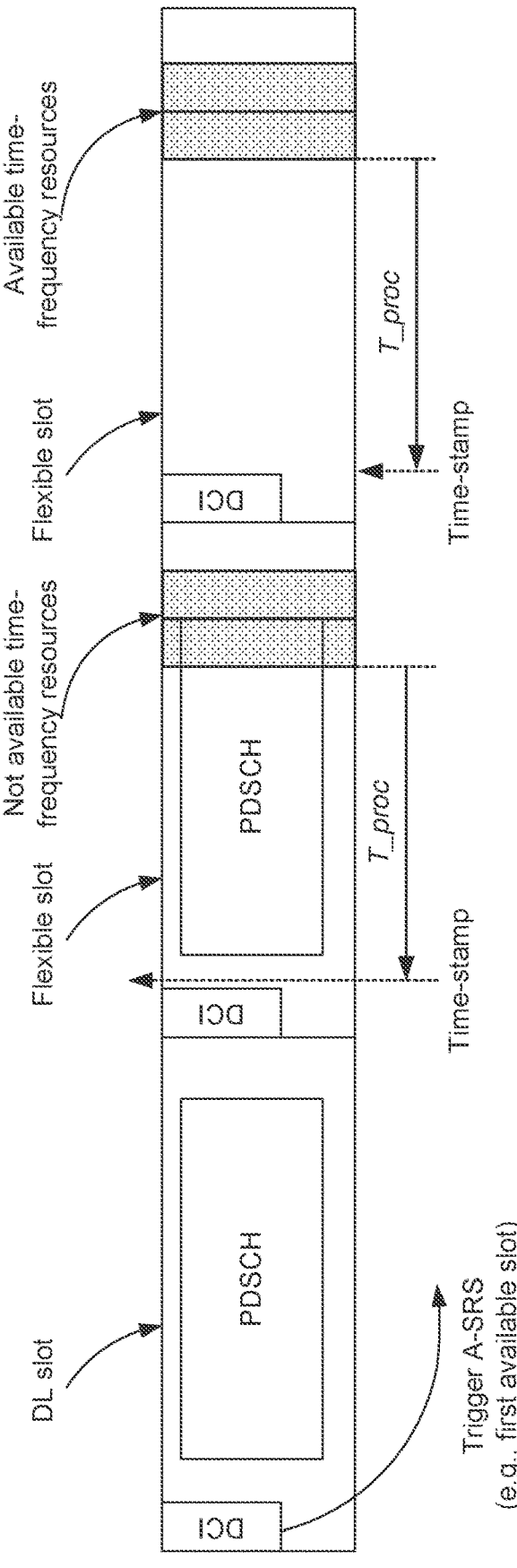

FIG. 8 is a diagram illustrating an example 800 of determining an available slot for an aperiodic SRS resource set, in accordance with various aspects of the present disclosure.

A UE (e.g., UE 120) may consider dynamic scheduling by DCI format 1_0, DCI format 1_1, and/or DCI format 1_2 when determining whether a candidate slot is an available slot. The UE may receive DCI(s) prior to a timestamp, where the UE may determine whether the candidate slot is an available slot based at least in part on the timestamp. Dynamic scheduling may dynamically schedule a PDSCH or a PUSCH.

As shown in FIG. 8, a UE may receive a first DCI from a base station in a downlink slot. The downlink slot may include a PDSCH. The DCI may trigger an aperiodic SRS transmission in a first available slot after the downlink slot. The downlink slot may be followed by a first flexible slot and a second flexible slot.

The UE may receive a second DCI from the base station in the first flexible slot. The UE may determine whether the first flexible slot is an available slot based at least in part on available information at the UE at a timestamp (n−T_proc). The UE may include the second DCI in the available information when determining whether the first flexible slot is an available slot. The second DCI may schedule a PDSCH in the first flexible slot, and the PDSCH may overlap with time-frequency resources (e.g., SRS resources) in the first flexible slot. As a result, the UE may determine that the time-frequency resources are not available, and that the first flexible slot is not an available slot.

The UE may receive a third DCI from the base station in the second flexible slot. The UE may determine whether the second flexible slot is an available slot based at least in part on available information at the UE at a timestamp (n−T_proc). The UE may include the third DCI in the available information when determining whether the second flexible slot is an available slot. The UE may determine that the second flexible slot includes available time-frequency resources. As a result, the UE may determine that the second flexible slot is an available slot (e.g., a first available slot) for the aperiodic SRS transmission.

As indicated above, FIG. 8 is provided as an example. Other examples may differ from what is described with regard to FIG. 8.

Figure 9:
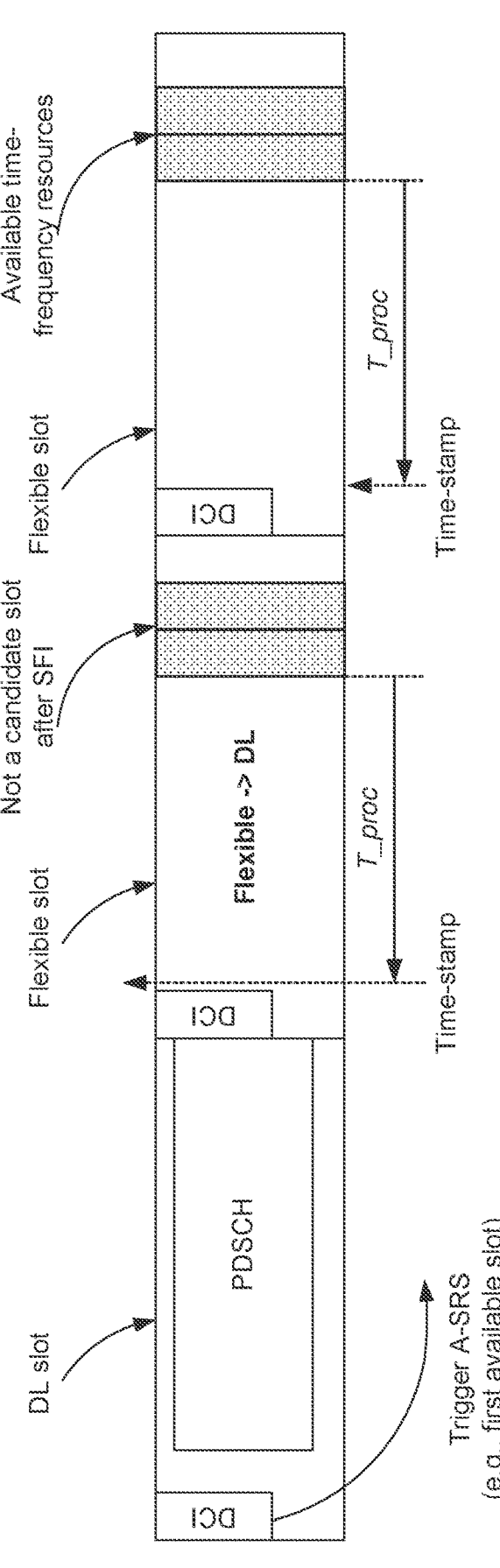

FIG. 9 is a diagram illustrating an example 900 of determining an available slot for an aperiodic SRS resource set, in accordance with various aspects of the present disclosure.

In some aspects, a base station may transmit an SFI using DCI format 2_0 to override some flexible symbols/slots into a downlink symbol/slot, an uplink symbol/slot, or a flexible symbol/slot. The flexible symbols/slots overridden by the SFI may be reserved resources, which may affect a UE when determining whether a candidate slot is an available slot.

In some aspects, the UE may consider SFI(s) received prior to a timestamp when determining whether a candidate slot is an available slot. The UE may determine whether the candidate slot is available based at least in part on an SFI received prior to the timestamp.

In some aspects, the UE may determine whether a candidate slot is an available slot based at least in part on an RRC configuration (e.g., only on an RRC configuration), and the UE may not consider SFI(s) when determining whether a candidate slot is an available slot. In some aspects, an SFI may be restricted between a time that a triggering DCI is received to a timestamp for determining whether a candidate slot is an available slot. In some aspects, an SFI may be allowed and a network may indicate to the UE (e.g., via DCI) that a candidate slot is an available slot.

As shown in FIG. 9, a UE may receive a first DCI from a base station in a downlink slot. The downlink slot may include a PDSCH. The first DCI may trigger an aperiodic SRS transmission in a first available slot after the downlink slot. The downlink slot may be followed by a first flexible slot and a second flexible slot.

The UE may receive an SFI from the base station in the first flexible slot. The SFI may convert the flexible slot to a downlink slot. The UE may receive the SFI prior to a timestamp (n−T_proc). As a result, the SFI may be available information to the UE, and may be used by the UE when determining whether the first flexible slot is an available slot. The UE may determine that the first flexible slot is not an available slot based at least in part on the SFI.

The UE may receive a second DCI from the base station in the second flexible slot. The UE may determine whether the second flexible slot is an available slot based at least in part on available information at the UE at a timestamp (n−T_proc). The UE may include the second DCI in the available information when determining whether the second flexible slot is an available slot. The UE may determine that the second flexible slot includes available time-frequency resources. As a result, the UE may determine that the second flexible slot is an available slot (e.g., a first available slot) for the aperiodic SRS transmission.

As indicated above, FIG. 9 is provided as an example. Other examples may differ from what is described with regard to FIG. 9.

Figure 10:
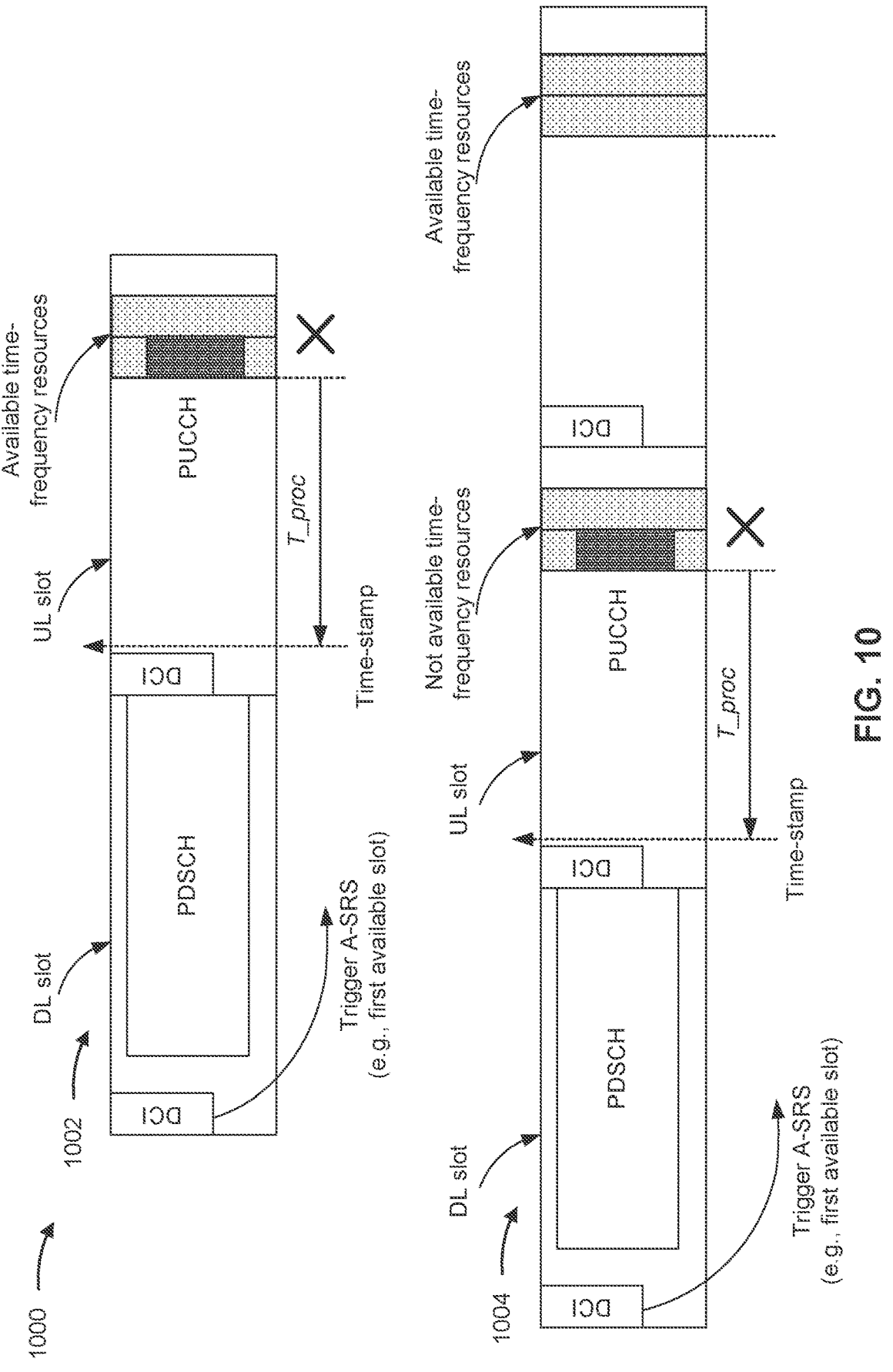

FIG. 10 is a diagram illustrating an example 1000 of determining an available slot for an aperiodic SRS resource set, in accordance with various aspects of the present disclosure.

In some aspects, an aperiodic SRS resource may collide with another higher priority channel, and an aperiodic SRS transmission may be dropped. In some aspects, the UE may determine an available slot prior to handling collision rules and priorities. However, in this case, an aperiodic SRS transmission may be dropped when colliding with a higher priority signal or channel. In some aspects, the UE may first handle the collision rules and priorities, and then may determine an available slot. In other words, the UE may postpone or delay an aperiodic SRS transmission until an available slot is reached. The UE may drop the aperiodic SRS transmission after reaching a certain number of delays due to a collision with a higher priority signal or channel.

As shown by reference number 1002, a UE may receive a DCI from a base station in a downlink slot. The downlink slot may include a PDSCH. The DCI may trigger an aperiodic SRS transmission in a first available slot after the downlink slot. The downlink slot may be followed by an uplink slot. The UE may determine whether the uplink slot is an available slot based at least in part on available information at the UE at a timestamp (n−T_proc). The UE may include the DCI in the available information when determining whether the uplink slot is an available slot. In this example, the UE may determine that time-frequency resources (e.g., SRS resources) in the uplink slot are available, and that the uplink slot is an available slot. However, an aperiodic SRS transmission may collide with a higher priority physical uplink control channel (PUCCH) transmission on the available time-frequency resources in the uplink slot, so the aperiodic SRS transmission may be dropped.

As shown by reference number 1004, a UE may receive a DCI from a base station in a downlink slot. The downlink slot may include a PDSCH. The DCI may trigger an aperiodic SRS transmission in a first available slot after the downlink slot. The downlink slot may be followed by a first uplink slot and a second uplink slot. The UE may determine whether the first uplink slot is an available slot based at least in part on available information at the UE at a timestamp (n−T_proc). The UE may include the DCI in the available information when determining whether the first uplink slot is an available slot. In this example, the UE may determine that time-frequency resources (e.g., SRS resources) in the first uplink slot are not available, and that the first uplink slot is not an available slot. The UE may determine that the time-frequency resources are not available due to the higher priority PUCCH transmission. The UE may determine that the second uplink slot is an available slot, and the UE may perform the aperiodic SRS transmission using the second uplink slot.

As indicated above, FIG. 10 is provided as an example. Other examples may differ from what is described with regard to FIG. 10.

Figure 11:
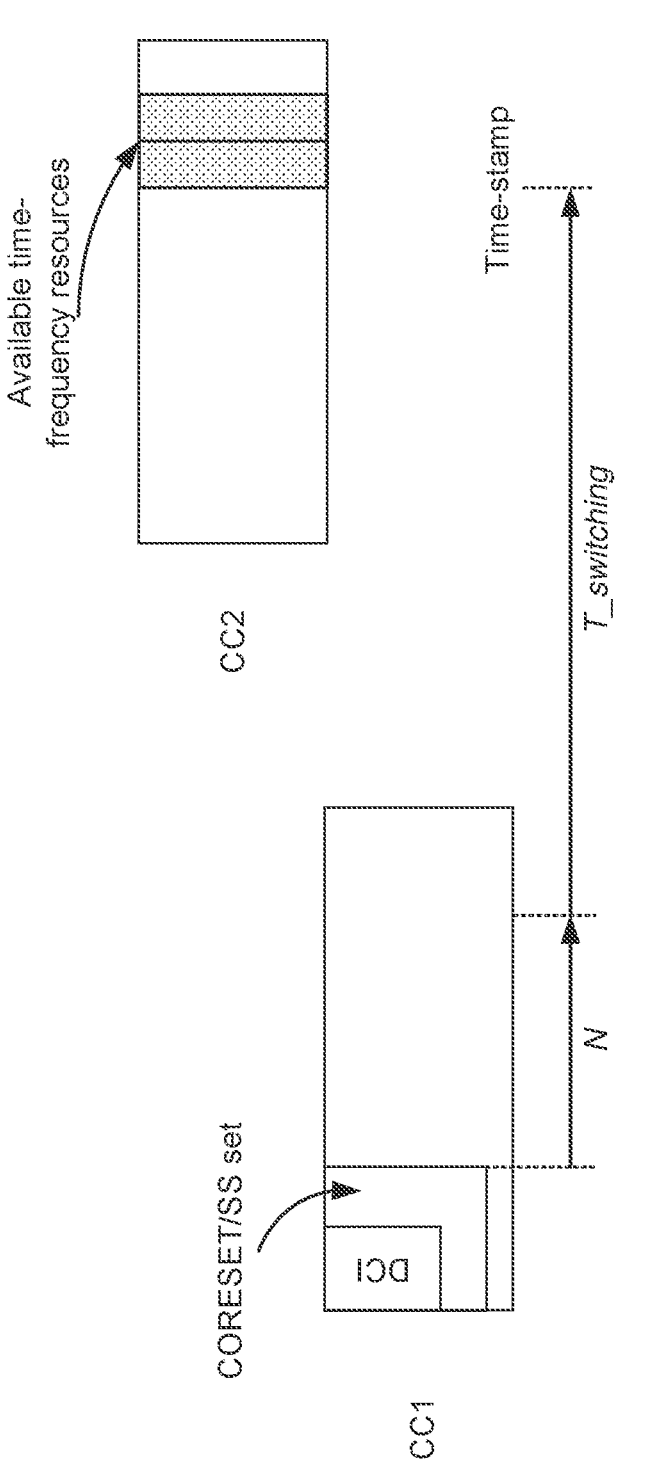

FIG. 11 is a diagram illustrating an example 1100 of determining an available slot for an aperiodic SRS resource set, in accordance with various aspects of the present disclosure.

A UE may receive a group-common DCI format 2_3 from a base station. The group-common DCI format 2_3 may enable the UE to switch an uplink transmission from a first serving cell associated with a first component carrier to a second serving cell associated with a second component carrier. The UE may switch to the second serving cell, without a PUSCH and a PUCCH, for transmitting an aperiodic SRS.

As shown in FIG. 11, a UE may receive a DCI from a base station. The UE may receive the first DCI via a first serving cell associated with a first component carrier. The UE may receive the first DCI using a CORESET or an SS set. The UE may receive a second DCI from the base station. The UE may receive the second DCI via a second serving cell associated with a second component carrier. Time-frequency resources (e.g., SRS resources) may be associated with the second component carrier. The UE may determine whether the time-frequency resources are available based at least in part on available information at the UE at a timestamp (N+Tswitching, which is equal to T_proc), where N is a reported capability as a minimum time interval (in symbols) between a triggering DCI and an aperiodic SRS transmission, and Tswitching is a time for an uplink or downlink radio frequency (RF) retuning to allow the UE to switch from the first serving cell to the second serving cell. The UE may include the first DCI in the available information when determining whether the time-frequency resources associated with the second component carrier are available.

As indicated above, FIG. 11 is provided as an example. Other examples may differ from what is described with regard to FIG. 11.

In some aspects, a DCI format 2_4 may include an uplink cancellation indication (UL-CI) for cancellation of a previously scheduled uplink resource, such as a dynamic grant (DG), a configured grant (CG), and/or an SRS. This DCI may cancel an uplink resource, which may affect a UE when determining whether a candidate slot is an available slot. In some aspects, the UE may consider available resources based at least in part on UL-CIs received prior to a timestamp when determining whether a candidate slot (e.g., an uplink slot) is an available slot.

In some aspects, the UE may determine whether a candidate slot is an available slot based at least in part on an RRC configuration (e.g., only on an RRC configuration), and the UE may not consider UL-Cis when determining whether a candidate slot is an available slot. In some aspects, UL-CIs may be allowed, but the UE may not consider cancelled uplink resources associated with the UL-CIs when determining whether a candidate slot is an available slot.

FIG. 12 is a diagram illustrating an example process 1200 performed, for example, by a UE, in accordance with various aspects of the present disclosure. Example process 1200 is an example where the UE (e.g., UE 120) performs operations associated with determining an available slot for an aperiodic SRS resource set.

As shown in FIG. 12, in some aspects, process 1200 may include receiving, from a base station, DCI that triggers one or more aperiodic SRS resource sets (block 1210). For example, the UE (e.g., using reception component 1302, depicted in FIG. 13) may receive, from a base station, DC that triggers one or more aperiodic SRS resource sets, as described above.

As further shown in FIG. 12, in some aspects, process 1200 may include determining that a candidate slot is an available slot associated with the one or more aperiodic SRS resource sets based at least in part on available information at a timestamp of the candidate slot, and one or more of an RRC configuration or dynamic event information (block 1220). For example, the UE (e.g., using determination component 1308, depicted in FIG. 13) may determine that a candidate slot is an available slot associated with the one or more aperiodic SRS resource sets based at least in part on available information at a timestamp of the candidate slot, and one or more of an RRC configuration or dynamic event information, as described above.

As further shown in FIG. 12, in some aspects, process 1200 may include transmitting, to the base station, an aperiodic SRS using the one or more aperiodic SRS resource sets of the available slot (block 1230). For example, the UE (e.g., using transmission component 1304, depicted in FIG. 13) may transmit, to the base station, an aperiodic SRS using the one or more aperiodic SRS resource sets of the available slot, as described above.

Process 1200 may include additional aspects, such as any single aspect or any combination of aspects described below and/or in connection with one or more other processes described elsewhere herein.

In a first aspect, process 1200 includes receiving, from the base station, a high layer parameter that configures the UE to determine that the candidate slot is the available slot based at least in part on the timestamp and the RRC configuration and by excluding the dynamic event information.

In a second aspect, alone or in combination with the first aspect, process 1200 includes receiving, from the base station, a high layer parameter that configures the UE to determine that the candidate slot is the available slot based at least in part on the timestamp, the RRC configuration, and the dynamic event information.

In a third aspect, alone or in combination with one or more of the first and second aspects, the RRC configuration includes a time division duplex uplink and downlink pattern, an SRS resource set configuration, and SRS resources configurations within the one or more aperiodic SRS resource sets.

In a fourth aspect, alone or in combination with one or more of the first through third aspects, the one or more aperiodic SRS resource sets and the SRS resources configurations include time and frequency configurations for transmitting the aperiodic SRS at the candidate slot.

In a fifth aspect, alone or in combination with one or more of the first through fourth aspects, the dynamic event information includes one or more of a slot format indicator received at the UE, dynamic scheduling information received at the UE, collision handling performed at the UE, carrier switching performed at the UE, downlink preemption indication information, or uplink cancellation information received at the UE.

In a sixth aspect, alone or in combination with one or more of the first through fifth aspects, the DCI that triggers the one or more aperiodic SRS resource sets is received in a first slot, and the available information at the timestamp of the candidate slot following the first slot is based at least in part on DCI associated with the candidate slot.

In a seventh aspect, alone or in combination with one or more of the first through sixth aspects, the candidate slot is an uplink slot, a flexible slot, or a special slot that is associated with available time and frequency resources for the one or more aperiodic SRS resource sets.

In an eighth aspect, alone or in combination with one or more of the first through seventh aspects, the candidate slot is the available slot based at least in part on the candidate slot including uplink symbols or flexible symbols for time-domain locations for a plurality of SRS resources in the one or more aperiodic SRS resource sets, and based at least in part on a minimum timing requirement between the DCI that triggers the one or more aperiodic SRS resource sets and the one or more aperiodic SRS resource sets.

In a ninth aspect, alone or in combination with one or more of the first through eighth aspects, the timestamp is based at least in part on a starting transmission time of the aperiodic SRS using the one or more aperiodic SRS resource sets and a minimum processing timeline capability.

In a tenth aspect, alone or in combination with one or more of the first through ninth aspects, the timestamp is based at least in part on an end of a last symbol in a control resource set associated with the candidate slot, a minimum processing timeline capability, and a constant number of symbols based at least in part on a UE capability.

In an eleventh aspect, alone or in combination with one or more of the first through tenth aspects, the timestamp is based at least in part on an end of a last symbol in a downlink control channel of a control resource set associated with the candidate slot, a minimum processing timeline capability, and a constant number of symbols based at least in part on a UE capability.

In a twelfth aspect, alone or in combination with one or more of the first through eleventh aspects, the timestamp is based at least in part on an end of a last symbol of a monitoring occasion of a search space set of a control resource set associated with the candidate slot, a minimum processing timeline capability, and a constant number of symbols based at least in part on a UE capability.

In a thirteenth aspect, alone or in combination with one or more of the first through twelfth aspects, the DCI that triggers the one or more aperiodic SRS resource sets is associated with a scheduling cell with a first subcarrier spacing, and the one or more aperiodic SRS resource sets is associated with a scheduled cell with a second subcarrier spacing.

In a fourteenth aspect, alone or in combination with one or more of the first through thirteenth aspects, the timestamp is based at least in part on a minimum processing timeline capability and a timing advance, and the minimum processing timeline capability is based at least in part on a maximum time duration between a first quantity of symbols of a numerology of the scheduling cell and a second quantity of symbols of a numerology of the scheduled cell.

In a fifteenth aspect, alone or in combination with one or more of the first through fourteenth aspects, the DCI that triggers the one or more aperiodic SRS resource sets is associated with a physical downlink control channel with a first subcarrier spacing, and the one or more aperiodic SRS resource sets is associated with a second subcarrier spacing.

In a sixteenth aspect, alone or in combination with one or more of the first through fifteenth aspects, the DCI is a first DCI and the candidate slot is a first candidate slot, and process 1200 includes determining that a second candidate slot is not an available slot based at least in part on second DCI received in the second candidate slot, wherein the second DCI dynamically schedules a downlink shared channel or an uplink shared channel in the second candidate slot that overlaps with time and frequency resources in the second candidate slot, and wherein the time and frequency resources in the second candidate slot are not available for the one or more aperiodic SRS resource sets.

In a seventeenth aspect, alone or in combination with one or more of the first through sixteenth aspects, the candidate slot is a first candidate slot, and process 1200 includes determining that a second candidate slot is not an available slot based at least in part on a slot format indicator received in the second candidate slot and prior to a timestamp of the second candidate slot, wherein the slot format indicator converts the second candidate slot from a flexible slot to a downlink slot, or the slot format indicator converts one or more symbols of the second candidate slot to reserved symbols or downlink symbols, and wherein the second candidate slot does not include time and frequency resources for the one or more aperiodic SRS resource sets.

In an eighteenth aspect, alone or in combination with one or more of the first through seventeenth aspects, process 1200 includes determining that the candidate slot is the available slot based at least in part on an exclusion of a slot format indicator received in the candidate slot.

In a nineteenth aspect, alone or in combination with one or more of the first through eighteenth aspects, a slot format indicator is restricted during a time duration between the DCI and the timestamp of the candidate slot.

In a twentieth aspect, alone or in combination with one or more of the first through nineteenth aspects, process 1200 includes determining a collision between the aperiodic SRS in the available slot and another signal or channel based at least in part on a set of collision and priority rules, and determining to drop the aperiodic SRS based at least in part on the collision, and after determining that the candidate slot is the available slot.

In a twenty-first aspect, alone or in combination with one or more of the first through twentieth aspects, process 1200 includes performing collision handling prior to determining that the candidate slot is the available slot.

In a twenty-second aspect, alone or in combination with one or more of the first through twenty-first aspects, process 1200 includes determining to drop the aperiodic SRS based at least in part on satisfying a threshold for a number of aperiodic SRS transmission delays due to collisions with other signals or channels.

In a twenty-third aspect, alone or in combination with one or more of the first through twenty-second aspects, the DCI is a first DCI, and process 1200 includes receiving a second DCI in the candidate slot, wherein the second DCI includes carrier switching information that enables the UE to switch from a first component carrier to a second component carrier for transmitting the aperiodic SRS.

In a twenty-fourth aspect, alone or in combination with one or more of the first through twenty-third aspects, the timestamp of the candidate slot is based at least in part on a minimum processing timeline capability, and the minimum processing timeline capability is based at least in part on a reported capability of a minimum time interval between the DCI and a transmission of the aperiodic SRS, and a time for the UE to switch from the first component carrier to the second component carrier.

In a twenty-fifth aspect, alone or in combination with one or more of the first through twenty-fourth aspects, the DCI is a first DCI and the candidate slot is a first candidate slot, and process 1200 includes receiving a second DCI in a second candidate slot, wherein the second DCI includes uplink cancellation information to cancel an uplink resource of the second candidate slot, and determining that the second candidate slot is not an available slot based at least in part on the uplink cancellation information received in the second candidate slot and prior to a timestamp of the second candidate slot.

In a twenty-sixth aspect, alone or in combination with one or more of the first through twenty-fifth aspects, process 1200 includes determining that the candidate slot is the available slot based at least in part on an exclusion of uplink cancellation information received in the candidate slot.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
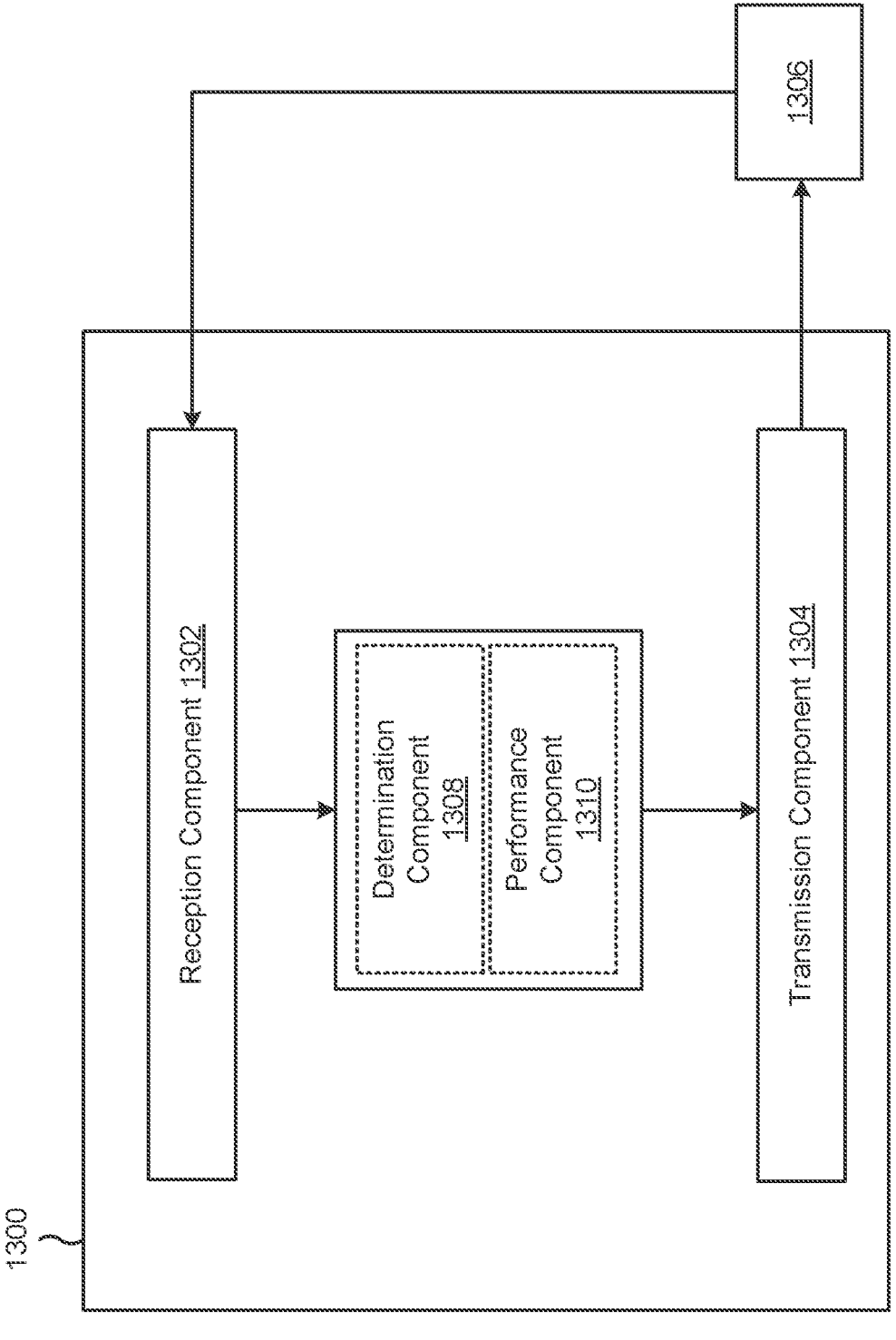
FIG. 13 is a block diagram of an example apparatus for wireless communication, in accordance with various aspects of the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a determination component 1308, or a performance component 1310, among other examples.

In some aspects, the apparatus 1300 may be configured to perform one or more operations described herein in connection with FIGS. 5-11. Additionally, or alternatively, the apparatus 1300 may be configured to perform one or more processes described herein, such as process 1200 of FIG. 12. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from a base station, DCI that triggers one or more aperiodic SRS resource sets. The determination component 1308 may determine that a candidate slot is an available slot associated with the one or more aperiodic SRS resource sets based at least in part on available information at a timestamp of the candidate slot, and one or more of an RRC configuration or dynamic event information. The transmission component 1304 may transmit, to the base station, an aperiodic SRS using the one or more aperiodic SRS resource sets of the available slot.

The reception component 1302 may receive, from the base station, a high layer parameter that configures the UE to determine that the candidate slot is the available slot based at least in part on the timestamp and the RRC configuration and by excluding the dynamic event information. The reception component 1302 may receive, from the base station, a high layer parameter that configures the UE to determine that the candidate slot is the available slot based at least in part on the timestamp, the RRC configuration, and the dynamic event information.

The determination component 1308 may determine a collision between the aperiodic SRS in the available slot and another signal or channel based at least in part on a set of collision and priority rules. The determination component 1308 may determine to drop the aperiodic SRS based at least in part on the collision, and after determining that the candidate slot is the available slot. The performing component 1310 may perform collision handling prior to determining that the candidate slot is the available slot. The determination component 1308 may determine to drop the aperiodic SRS based at least in part on satisfying a threshold for a number of aperiodic SRS transmission delays due to collisions with other signals or channels.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some aspects of the present disclosure:

Aspect 1: A method of wireless communication performed by a user equipment (UE), comprising: receiving, from a base station, downlink control information (DCI) that triggers one or more aperiodic sounding reference signal (SRS) resource sets; determining that a candidate slot is an available slot associated with the one or more aperiodic SRS resource sets based at least in part on available information at a timestamp of the candidate slot, and one or more of a radio resource control (RRC) configuration or dynamic event information; and transmitting, to the base station, an aperiodic SRS using the one or more aperiodic SRS resource sets of the available slot.

Aspect 2: The method of aspect 1, further comprising: receiving, from the base station, a high layer parameter that configures the UE to determine that the candidate slot is the available slot based at least in part on the timestamp and the RRC configuration and by excluding the dynamic event information.

Aspect 3: The method of any of aspects 1 through 2, further comprising: receiving, from the base station, a high layer parameter that configures the UE to determine that the candidate slot is the available slot based at least in part on the timestamp, the RRC configuration, and the dynamic event information.

Aspect 4: The method of any of aspects 1 through 2, wherein the RRC configuration includes a time division duplex uplink and downlink pattern, an SRS resource set configuration, and SRS resources configurations within the one or more aperiodic SRS resource sets.

Aspect 5: The method of aspect 4, wherein the one or more aperiodic SRS resource sets and the SRS resources configurations include time and frequency configurations for transmitting the aperiodic SRS at the candidate slot.

Aspect 6: The method of any of aspects 1 through 5, wherein the dynamic event information includes one or more of: a slot format indicator received at the UE, dynamic scheduling information received at the UE, collision handling performed at the UE, carrier switching performed at the UE, downlink preemption indication information, or uplink cancellation information received at the UE.

Aspect 7: The method of any of aspects 1 through 6, wherein the DCI that triggers the one or more aperiodic SRS resource sets is received in a first slot, and the available information at the timestamp of the candidate slot following the first slot is based at least in part on DCI associated with the candidate slot.

Aspect 8: The method of any of aspects 1 through 7, wherein the candidate slot is an uplink slot, a flexible slot, or a special slot that is associated with available time and frequency resources for the one or more aperiodic SRS resource sets.

Aspect 9: The method of any of aspects 1 through 8, wherein the candidate slot is the available slot based at least in part on the candidate slot including uplink symbols or flexible symbols for time-domain locations for a plurality of SRS resources in the one or more aperiodic SRS resource sets, and based at least in part on a minimum timing requirement between the DCI that triggers the one or more aperiodic SRS resource sets and the one or more aperiodic SRS resource sets.

Aspect 10: The method of any of aspects 1 through 9, wherein the timestamp is based at least in part on a starting transmission time of the aperiodic SRS using the one or more aperiodic SRS resource sets and a minimum processing timeline capability.

Aspect 11: The method of any of aspects 1 through 10, wherein the timestamp is based at least in part on an end of a last symbol in a control resource set associated with the candidate slot, a minimum processing timeline capability, and a constant number of symbols based at least in part on a UE capability.

Aspect 12: The method of any of aspects 1 through 11, wherein the timestamp is based at least in part on an end of a last symbol in a downlink control channel of a control resource set associated with the candidate slot, a minimum processing timeline capability, and a constant number of symbols based at least in part on a UE capability.

Aspect 13: The method of any of aspects 1 through 12, wherein the timestamp is based at least in part on an end of a last symbol of a monitoring occasion of a search space set of a control resource set associated with the candidate slot, a minimum processing timeline capability, and a constant number of symbols based at least in part on a UE capability.

Aspect 14: The method of any of aspects 1 through 13, wherein the DCI that triggers the one or more aperiodic SRS resource sets is associated with a scheduling cell with a first subcarrier spacing and the one or more aperiodic SRS resource sets is associated with a scheduled cell with a second subcarrier spacing.

Aspect 15: The method of aspect 14, wherein the timestamp is based at least in part on a minimum processing timeline capability and a timing advance, and wherein the minimum processing timeline capability is based at least in part on a maximum time duration between a first quantity of symbols of a numerology of the scheduling cell and a second quantity of symbols of a numerology of the scheduled cell.

Aspect 16: The method of any of aspects 1 through 15, wherein the DCI that triggers the one or more aperiodic SRS resource sets is associated with a physical downlink control channel with a first subcarrier spacing and the one or more aperiodic SRS resource sets is associated with a second subcarrier spacing.

Aspect 17: The method of any of aspects 1 through 16, wherein the DCI is a first DCI and the candidate slot is a first candidate slot, and further comprising: determining that a second candidate slot is not an available slot based at least in part on second DCI received in the second candidate slot, wherein the second DCI dynamically schedules a downlink shared channel or an uplink shared channel in the second candidate slot that overlaps with time and frequency resources in the second candidate slot, and wherein the time and frequency resources in the second candidate slot are not available for the one or more aperiodic SRS resource sets.

Aspect 18: The method of any of aspects 1 through 17, wherein the candidate slot is a first candidate slot, and further comprising: determining that a second candidate slot is not an available slot based at least in part on a slot format indicator received in the second candidate slot and prior to a timestamp of the second candidate slot, wherein the slot format indicator converts the second candidate slot from a flexible slot to a downlink slot, or the slot format indicator converts one or more symbols of the second candidate slot to reserved symbols or downlink symbols, and wherein the second candidate slot does not include time and frequency resources for the one or more aperiodic SRS resource sets.

Aspect 19: The method of any of aspects 1 through 18, wherein determining that the candidate slot is the available slot comprises determining that the candidate slot is the available slot based at least in part on an exclusion of a slot format indicator received in the candidate slot.

Aspect 20: The method of any of aspects 1 through 19, wherein a slot format indicator is restricted during a time duration between the DCI and the timestamp of the candidate slot.

Aspect 21: The method of any of aspects 1 through 20, further comprising: determining a collision between the aperiodic SRS in the available slot and another signal or channel based at least in part on a set of collision and priority rules; and determining to drop the aperiodic SRS based at least in part on the collision, and after determining that the candidate slot is the available slot.

Aspect 22: The method of any of aspects 1 through 21, further comprising: performing collision handling prior to determining that the candidate slot is the available slot.

Aspect 23: The method of any of aspects 1 through 22, further comprising: determining to drop the aperiodic SRS based at least in part on satisfying a threshold for a number of aperiodic SRS transmission delays due to collisions with other signals or channels.

Aspect 24: The method of any of aspects 1 through 23, wherein the DCI is a first DCI, and further comprising: receiving a second DCI in the candidate slot, wherein the second DCI includes carrier switching information that enables the UE to switch from a first component carrier to a second component carrier for transmitting the aperiodic SRS.

Aspect 25: The method of aspect 24, wherein the timestamp of the candidate slot is based at least in part on a minimum processing timeline capability, and wherein the minimum processing timeline capability is based at least in part on: a reported capability of a minimum time interval between the DCI and a transmission of the aperiodic SRS, and a time for the UE to switch from the first component carrier to the second component carrier.

Aspect 26: The method of any of aspects 1 through 25, wherein the DCI is a first DCI and the candidate slot is a first candidate slot, and further comprising: receiving a second DCI in a second candidate slot, wherein the second DCI includes uplink cancellation information to cancel an uplink resource of the second candidate slot; and determining that the second candidate slot is not an available slot based at least in part on the uplink cancellation information received in the second candidate slot and prior to a timestamp of the second candidate slot.

Aspect 27: The method of any of aspects 1 through 26, wherein determining that the candidate slot is the available slot comprises determining that the candidate slot is the available slot based at least in part on an exclusion of uplink cancellation information received in the candidate slot.

Aspect 28: An apparatus for wireless communication at a device, comprising a processor; memory coupled with the processor; and instructions stored in the memory and executable by the processor to cause the apparatus to perform the method of one or more aspects of aspects 1-27.

Aspect 29: A device for wireless communication, comprising a memory and one or more processors coupled to the memory, the memory and the one or more processors configured to perform the method of one or more aspects of aspects 1-27.

Aspect 30: An apparatus for wireless communication, comprising at least one means for performing the method of one or more aspects of aspects 1-27.

Aspect 31: A non-transitory computer-readable medium storing code for wireless communication, the code comprising instructions executable by a processor to perform the method of one or more aspects of aspects 1-27.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors operatively coupled to the one or more memories, the one or more memories and the one or more processors configured to:

receive, from a base station, downlink control information (DCI) that triggers one or more aperiodic sounding reference signal (SRS) resource sets;

determine that a candidate slot is an available slot associated with the one or more aperiodic SRS resource sets based at least in part on available information at a timestamp of the candidate slot, and one or more of a radio resource control (RRC) configuration or dynamic event information, wherein the timestamp is based at least in part on an end of a last symbol in a downlink control channel of a control resource set associated with the candidate slot, a minimum processing timeline capability, and a constant number of symbols based at least in part on a UE capability; and transmit, to the base station, an aperiodic SRS using the one or more aperiodic SRS resource sets of the available slot.

2. The UE of claim 1, wherein the memory and the one or more processors are further configured to:

receive, from the base station, a high layer parameter that configures the UE to determine that the candidate slot is the available slot based at least in part on the timestamp and the RRC configuration and by excluding the dynamic event information.

3. The UE of claim 1, wherein the memory and the one or more processors are further configured to:

receive, from the base station, a high layer parameter that configures the UE to determine that the candidate slot is the available slot based at least in part on the timestamp, the RRC configuration, and the dynamic event information.

4. The UE of claim 1, wherein the RRC configuration includes a time division duplex uplink and downlink pattern, an SRS resource set configuration, and SRS resources configurations within the one or more aperiodic SRS resource sets.

5. The UE of claim 4, wherein the one or more aperiodic SRS resource sets and the SRS resources configurations include time and frequency configurations for transmitting the aperiodic SRS at the candidate slot.

6. The UE of claim 1, wherein the dynamic event information includes one or more of: a slot format indicator received at the UE, dynamic scheduling information received at the UE, collision handling performed at the UE, carrier switching performed at the UE, downlink preemption indication information, or uplink cancellation information received at the UE.

7. The UE of claim 1, wherein the DCI that triggers the one or more aperiodic SRS resource sets is received in a first slot, and the available information at the timestamp of the candidate slot following the first slot is based at least in part on DCI associated with the candidate slot.

8. The UE of claim 1, wherein the candidate slot is an uplink slot, a flexible slot, or a special slot that is associated with available time and frequency resources for the one or more aperiodic SRS resource sets.

9. The UE of claim 1, wherein the candidate slot is the available slot based at least in part on the candidate slot including uplink symbols or flexible symbols for time-domain locations for a plurality of SRS resources in the one or more aperiodic SRS resource sets, and based at least in part on a minimum timing requirement between the DCI that triggers the one or more aperiodic SRS resource sets and the one or more aperiodic SRS resource sets.

10. The UE of claim 1, wherein the timestamp is further based at least in part on a starting transmission time of the aperiodic SRS using the one or more aperiodic SRS resource sets.

11. The UE of claim 1, wherein the timestamp is further based at least in part on an end of a last symbol in a control resource set associated with the candidate slot.

12. The UE of claim 1, wherein the timestamp is further based at least in part on an end of a last symbol of a monitoring occasion of a search space set of a control resource set associated with the candidate slot.

13. The UE of claim 1, wherein the DCI that triggers the one or more aperiodic SRS resource sets is associated with a scheduling cell with a first subcarrier spacing and the one or more aperiodic SRS resource sets is associated with a scheduled cell with a second subcarrier spacing.

14. The UE of claim 13, wherein the timestamp is further based at least in part on a timing advance, and wherein the minimum processing timeline capability is based at least in part on a maximum time duration between a first quantity of symbols of a numerology of the scheduling cell and a second quantity of symbols of a numerology of the scheduled cell.

15. The UE of claim 1, wherein the DCI that triggers the one or more aperiodic SRS resource sets is associated with a physical downlink control channel with a first subcarrier spacing and the one or more aperiodic SRS resource sets is associated with a second subcarrier spacing.

16. The UE of claim 1, wherein the DCI is a first DCI and the candidate slot is a first candidate slot, and wherein the memory and the one or more processors are further configured to:

determine that a second candidate slot is not an available slot based at least in part on second DCI received in the second candidate slot, wherein the second DCI includes dynamic scheduling information that dynamically schedules a downlink shared channel or an uplink shared channel in the second candidate slot that overlaps with time and frequency resources in the second candidate slot, and wherein the time and frequency resources in the second candidate slot are not available for the one or more aperiodic SRS resource sets.

17. The UE of claim 1, wherein the candidate slot is a first candidate slot, and wherein the memory and the one or more processors are further configured to:

determine that a second candidate slot is not an available slot based at least in part on a slot format indicator received in the second candidate slot and prior to a timestamp of the second candidate slot, wherein the slot format indicator converts the second candidate slot from a flexible slot to a downlink slot, or the slot format indicator converts one or more symbols of the second candidate slot to reserved symbols or downlink symbols, and wherein the second candidate slot does not include time and frequency resources for the one or more aperiodic SRS resource sets.

18. The UE of claim 1, wherein the memory and the one or more processors, when determining that the candidate slot is the available slot, are configured to determine that the candidate slot is the available slot based at least in part on an exclusion of a slot format indicator received in the candidate slot.

19. The UE of claim 1, wherein a slot format indicator is restricted during a time duration between the DCI and the timestamp of the candidate slot.

20. The UE of claim 1, wherein the memory and the one or more processors are further configured to:

determine a collision between the aperiodic SRS in the available slot and another signal or channel based at least in part on a set of collision and priority rules; and determine to drop the aperiodic SRS based at least in part on the collision, and after determining that the candidate slot is the available slot.

21. The UE of claim 1, wherein the memory and the one or more processors are further configured to:

perform collision handling prior to determining that the candidate slot is the available slot.

22. The UE of claim 1, wherein the memory and the one or more processors are further configured to:

determine to drop the aperiodic SRS based at least in part on satisfying a threshold for a number of aperiodic SRS transmission delays due to collisions with other signals or channels.

23. The UE of claim 1, wherein the DCI is a first DCI, and further comprising:

receive a second DCI in the candidate slot, wherein the second DCI includes carrier switching information that enables the UE to switch from a first component carrier to a second component carrier for transmitting the aperiodic SRS.

24. The UE of claim 23, wherein the minimum processing timeline capability is based at least in part on: a reported capability of a minimum time interval between the DCI and a transmission of the aperiodic SRS, and a time for the UE to switch from the first component carrier to the second component carrier.

25. The UE of claim 1, wherein the DCI is a first DCI and the candidate slot is a first candidate slot, and wherein the memory and the one or more processors are further configured to:

receive a second DCI in a second candidate slot, wherein the second DCI includes uplink cancellation information to cancel an uplink resource of the second candidate slot; and determine that the second candidate slot is not an available slot based at least in part on the uplink cancellation information received in the second candidate slot and prior to a timestamp of the second candidate slot.

26. The UE of claim 1, wherein the memory and the one or more processors, when determining that the candidate slot is the available slot, are configured to determine that the candidate slot is the available slot based at least in part on an exclusion of uplink cancellation information received in the candidate slot.

27. The UE of claim 1, wherein the DCI is a first DCI, wherein the candidate slot is a first candidate slot, and wherein the memory and the one or more processors are further configured to:

determine that a second candidate slot is not an available slot based at least in part on one or more of a slot format indicator, a second DCI, or uplink cancellation information received in the second candidate slot and prior to a timestamp of the second candidate slot, wherein the slot format indicator converts the second candidate slot from a flexible slot to a downlink slot, or the slot format indicator converts one or more symbols of the second candidate slot to reserved symbols or downlink symbols, wherein the second DCI includes dynamic scheduling information that dynamically schedules a downlink shared channel or an uplink shared channel in the second candidate slot that overlaps with time and frequency resources in the second candidate slot, or wherein the uplink cancellation information is to cancel an uplink resource of the second candidate slot.

28. A method of wireless communication performed by a user equipment (UE), comprising:

receiving, from a base station, downlink control information (DCI) that triggers one or more aperiodic sounding reference signal (SRS) resource sets;

determining that a candidate slot is an available slot associated with the one or more aperiodic SRS resource sets based at least in part on available information at a timestamp of the candidate slot, and one or more of a radio resource control (RRC) configuration or dynamic event information, wherein the timestamp is based at least in part on an end of a last symbol in a downlink control channel of a control resource set associated with the candidate slot, a minimum processing timeline capability, and a constant number of symbols based at least in part on a UE capability; and transmitting, to the base station, an aperiodic SRS using the one or more aperiodic SRS resource sets of the available slot.

29. The method of claim 28, further comprising:

receiving, from the base station, a high layer parameter that configures the UE to determine that the candidate slot is the available slot based at least in part on the timestamp and the RRC configuration and by excluding the dynamic event information.

30. The method of claim 28, further comprising:

receiving, from the base station, a high layer parameter that configures the UE to determine that the candidate slot is the available slot based at least in part on the timestamp, the RRC configuration, and the dynamic event information.

31. The method of claim 28, wherein the candidate slot is a first candidate slot, and further comprising:

determining that a second candidate slot is not an available slot based at least in part on a slot format indicator received in the second candidate slot and prior to a timestamp of the second candidate slot, wherein the slot format indicator converts the second candidate slot from a flexible slot to a downlink slot, or the slot format indicator converts one or more symbols of the second candidate slot to reserved symbols or downlink symbols, and wherein the second candidate slot does not include time and frequency resources for the one or more aperiodic SRS resource sets.

32. The method of claim 28, wherein determining that the candidate slot is the available slot comprises determining that the candidate slot is the available slot based at least in part on an exclusion of a slot format indicator received in the candidate slot.

33. The method of claim 28, wherein determining that the candidate slot is the available slot comprises determining that the candidate slot is the available slot based at least in part on an exclusion of uplink cancellation information received in the candidate slot.

34. A non-transitory computer-readable medium storing a set of instructions for wireless communication, the set of instructions comprising:

one or more instructions that, when executed by one or more processors of a user equipment (UE), cause the UE to:

receive, from a base station, downlink control information (DCI) that triggers one or more aperiodic sounding reference signal (SRS) resource sets;

determine that a candidate slot is an available slot associated with the one or more aperiodic SRS resource sets based at least in part on available information at a timestamp of the candidate slot, and one or more of a radio resource control (RRC) configuration or dynamic event information, wherein the timestamp is based at least in part on an end of a last symbol in a downlink control channel of a control resource set associated with the candidate slot, a minimum processing timeline capability, and a constant number of symbols based at least in part on a UE capability; and transmit, to the base station, an aperiodic SRS using the one or more aperiodic SRS resource sets of the available slot.

35. An apparatus for wireless communication, comprising:

means for receiving, from a base station, downlink control information (DCI) that triggers one or more aperiodic sounding reference signal (SRS) resource sets;

means for determining that a candidate slot is an available slot associated with the one or more aperiodic SRS resource sets based at least in part on available information at a timestamp of the candidate slot, and one or more of a radio resource control (RRC) configuration or dynamic event information, wherein the timestamp is based at least in part on an end of a last symbol in a downlink control channel of a control resource set associated with the candidate slot, a minimum processing timeline capability, and a constant number of symbols based at least in part on a UE capability; and means for transmitting, to the base station, an aperiodic SRS using the one or more aperiodic SRS resource sets of the available slot.

\* \* \* \* \*